US011184660B1

(12) United States Patent
Ewanchuk et al.

(10) Patent No.: US 11,184,660 B1
(45) Date of Patent: Nov. 23, 2021

(54) VOICE-BASED STATE SWITCHING AND LED SELECTION FOR REMOTE CONTROL DEVICES

(71) Applicant: Amazon Technologies, Inc., Seattle, WA (US)

(72) Inventors: Brian Ewanchuk, Redmond, WA (US); Hongmei Dilip Li, Santa Clara, CA (US); Bernardo De Carvalho e Silva, Seattle, WA (US); Balsa Laban, Mercer Island, WA (US); Vijai Rajagopal, Santa Clara, CA (US); Chang Hwa Rob Yang, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 99 days.

(21) Appl. No.: 16/145,017

(22) Filed: Sep. 27, 2018

(51) Int. Cl.
*H04N 21/422* (2011.01)
*G06F 3/16* (2006.01)

(52) U.S. Cl.
CPC ....... *H04N 21/42222* (2013.01); *G06F 3/167* (2013.01)

(58) Field of Classification Search
CPC ......... H04N 21/42222; H04N 21/4126; H04N 21/42204; H04N 21/42207; H04N 21/42221; H04N 21/42225; H04N 21/42226; H04N 21/42227; H04N 21/42228; H04N 21/42218; H04N 21/8186; H04N 1/00403; G06F 3/167; G08C 2201/31; G08C 2201/92; G05B 2219/23386

See application file for complete search history.

(56) References Cited

U.S. PATENT DOCUMENTS

| | | | | |
|---|---|---|---|---|
| 2005/0097618 A1* | 5/2005 | Arling | ............. | H04N 21/25858 725/114 |
| 2006/0267741 A1* | 11/2006 | Park | ...................... | G08C 17/02 340/12.3 |
| 2009/0207134 A1* | 8/2009 | Spilo | ........................ | G06F 3/02 345/158 |
| 2012/0030712 A1* | 2/2012 | Chang | ................ | H04N 21/4828 725/52 |
| 2017/0061443 A1* | 3/2017 | Wolf | .................... | G06Q 30/016 |
| 2018/0322870 A1* | 11/2018 | Lee | ......................... | G10L 15/22 |

* cited by examiner

*Primary Examiner* — Benjamin R Bruckart
*Assistant Examiner* — Tien M Nguyen
(74) *Attorney, Agent, or Firm* — Eversheds Sutherland (US) LLP

(57) ABSTRACT

Devices and methods are provided for dynamically switching states of remote control devices. A remote control device may receive voice data from a user, send the voice data to another device which may pass the voice signals to a server. The server may determine instructions associated with responding to the voice signals and send the instructions to the other device, which may convert the instructions to remote control commands. The other device may send the commands along with state information to the remote control device, allowing the remote control device to emit commands determined by the other device and to map other command signals to possible inputs which the remote control device may receive.

20 Claims, 8 Drawing Sheets

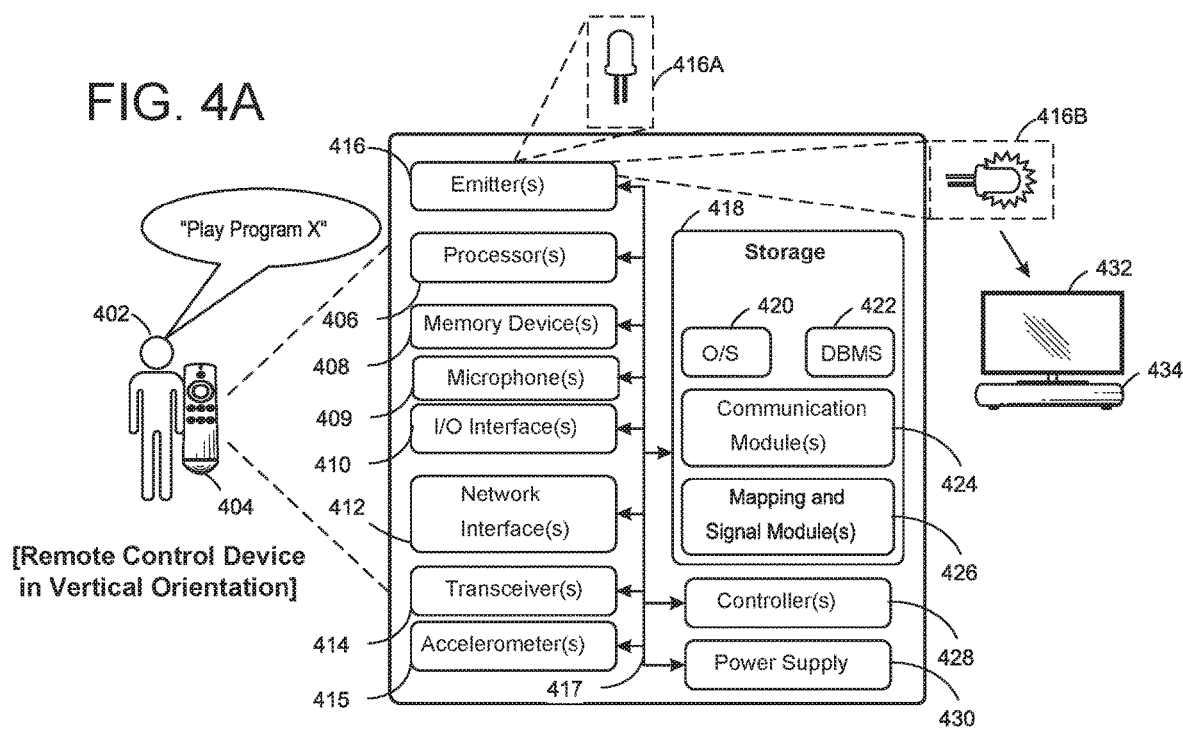
FIG. 4A
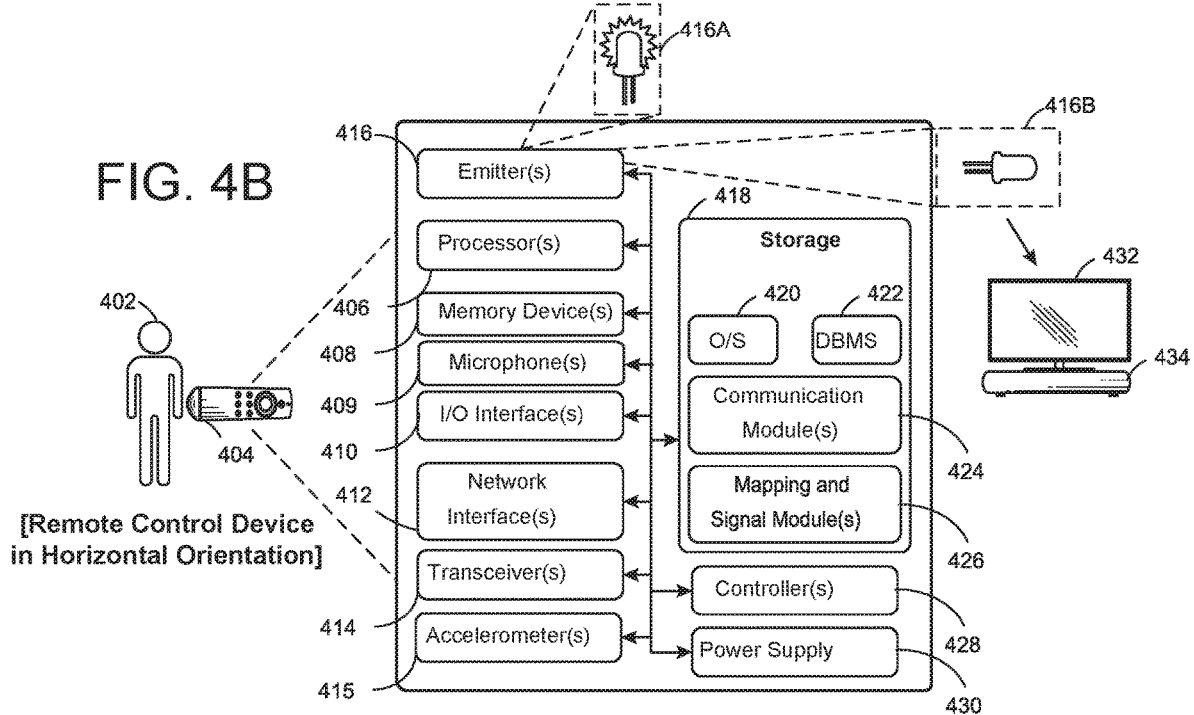
FIG. 4B
FIGS. 4A and 4B

VOICE-BASED STATE SWITCHING AND LED SELECTION FOR REMOTE CONTROL DEVICES

BACKGROUND

Remote control devices may receive user inputs in a variety of ways and may control multiple types of devices. User inputs may translate to signals for a remote control device to send to one or more other devices. Different controls of a remote control device may be associated with different signals for different devices, but the respective signals may be fixed after configuration by a user. However, system configurations may change based on active components of a system, such as whether a sound bar is being used, and so forth. Remote control devices may be unable to detect when a system configuration has changed.

BRIEF DESCRIPTION OF THE DRAWINGS

FIG. 4A schematically illustrates an example remote control device, in accordance with one or more example embodiments of the present disclosure.

FIG. 4B schematically illustrates an example remote control device, in accordance with one or more example embodiments of the present disclosure.

Figure 1:
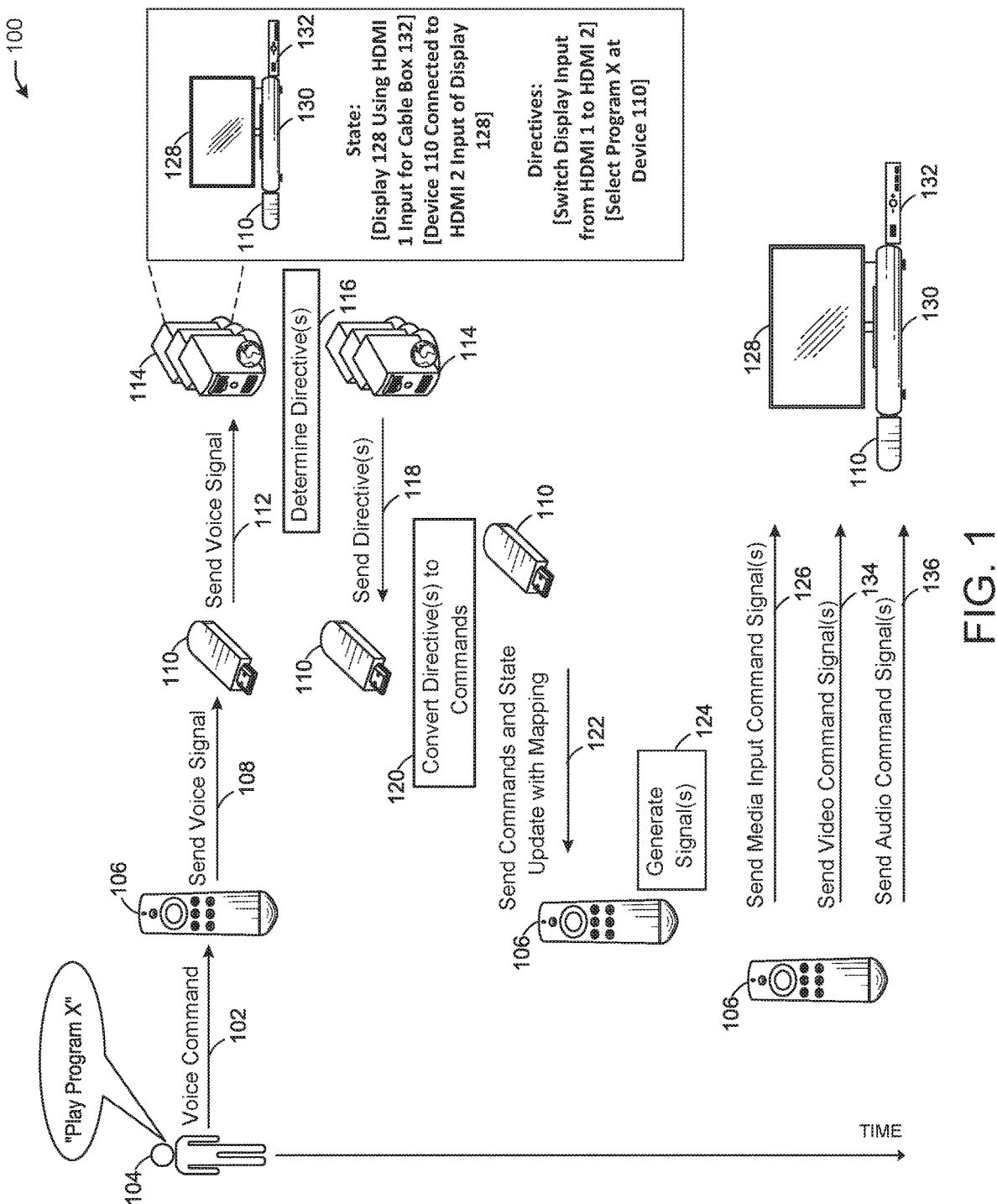
FIG. 1 illustrates a process for switching a state of a remote control device and sending command signals with the remote control device, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for controlling the state of a remote control device capable of controlling other devices using voice commands. A state may refer to an existing condition of equipment at a given time. For example, a state may indicate the devices in a media configuration (e.g., a television, stereo receiver, cable box, gaming system, etc.), the on/off state of given devices, the input status of given devices (e.g., HDMI 1, HDMI 2, coaxial cable, optical, etc.), and the connectivity of the devices (e.g., the cable box connects to HDMI 1 of the television, a streaming video device connects to HDMI 2 of the television, etc.). If a remote control device is aware of which devices or inputs are being used to execute a user command (e.g., a command to increase volume), then the remote control device may map commands to control signals based on the state. For example, if a remote control device is aware of a state indicating that a cable box corresponding to the HDMI 1 input on a television is to receive command signals, the remote control device may map (e.g., using a mapping table) commands (e.g., volume and channel buttons on the remote control device) to the command signals used to control the cable box.

A remote control device may receive user inputs, including voice commands, intended to cause the remote control device to send one or more command signals to cause other devices to perform actions such as switching inputs, turning devices on and off, causing video/audio playback, adjusting volume, etc. The use of voice commands may increase the number of control signals and the overall functionality that a remote control device may provide. For example, a remote control device may have a limited number of buttons or touch screen icons which may convert to command signals, and remote control devices may store a number of command signals based on memory capabilities of the remote control device. By using voice commands which are translated remotely (e.g., by a device other than the remote control device), the number of remote control commands may be increased.

A received user input may be converted to a command signal. For example, a push of a button associated with a remote control device may result in a command signal including a code which corresponds to a device for which the command signal is intended (e.g., a power on code for a television may be different than a power on code for a stereo device). The signal generated by the button push may be mapped (e.g., using a mapping table) to a command signal, which may be generated and sent by the remote control device. A voice command or other type of interaction with the remote control device may be converted into one or more command signals, and to increase the number of commands to which a remote control device may respond, the command signals may be determined remotely and provided to the remote control device.

If a remote control device command is a change channel command, for example, the remote control device may map change channel commands to a particular device (e.g., a cable box) which may be configured to perform the action of changing a channel. For example, the remote control device may use a mapping table to identify a command signal to send when a change channel button is pushed. Based on the mapping of a channel change command, the remote control device may generate the command signal for the cable box (e.g., using an infrared code designated for the cable box) and may send the command signal to the cable box to cause the cable box to change channels.

If the remote control device command is a voice command (e.g., captured by a microphone associated with the remote control device), the remote control device may convert the microphone input to a voice signal (e.g., voice data) to be analyzed for identifying corresponding command signals. To allow the remote control device to outsource the analysis of the voice signal (e.g., voice data), the remote control device may send the voice signal to another device (e.g., a video streaming device, etc.) which may send the voice signal to a server (e.g., a cloud server) for processing. The cloud server may be aware of the state of the media devices (e.g., a user may input state information via the remote control device, which may be sent to the server via the video streaming device, etc.). The cloud server may interpret the voice signal to determine the meaning of the voice signal and whether the meaning is associated with any actions/directives (e.g., turning devices on or off, switching media inputs, selecting content for playback, etc.). An action/directive may refer to an instruction, such as an instruction to power a device on or off, an instruction to change device inputs, an instruction to select content, an instruction to change device volume, an instruction to change channels, etc. For example, if the state information indicates that a television is off, and the voice signal corresponds to playing video content on the television, then the server may determine an action to turn on the television and an action to cause playback of the video content (e.g., switching the input of the television to an input corresponding to a cable box or video streaming device, sending a signal to the cable box or video streaming device to cause playback of the video content, etc.). Outsourcing the analysis of voice signals captured by a remote control device may allow for less processing and power resources to be used by the remote control device, for example.

For example, if the voice signal is indicative of a command to play content on the channel ESPN, the directive may include causing a television to switch input connections (e.g., from HDMI 1 to HDMI 2) to receive the ESPN video data from a cable box that is connected to the HDMI 2 input connection on the television. The server may analyze the state information to determine that ESPN is a channel change command associated with a cable box, that the cable box is associated with HDMI 2 on the television, and that the television is currently operating with HDMI 1 selected/enabled. The directive/action may be sent to the video streaming device, which may determine the remote control device commands (e.g., a switch input command) associated with the directive/action. For example, the video streaming device may use a mapping table to determine a command signal used to switch the television to the HDMI 2 input. The video streaming device may send the respective command signal to the remote control device to allow the remote control device to generate the command signal to cause the television to change to the HDMI 2 input.

Actions/directives may be associated with multiple command signals. For example, if the state of devices indicates that multiple devices need to be turned on, multiple device inputs need to be selected/enabled, and that video content (e.g., a channel or selected video) is to be played, then an action/directive may include multiple command signals in a macro to the video streaming device or other device. The video streaming device or other device may determine the command signals for the remote control device to send based on the actions/directives, and may send instructions, including the state update (e.g., an indication that a device on the television's HDMI 2 input is in use) to the remote control device to generate those command signals. The video streaming device may identify commands intended to control itself. For example, if a directive indicates a command for the video streaming device to select and send particular content to a television, then the video streaming device may execute the command without having to provide a command signal to the remote control device for the remote control device to send back to the video streaming device.

The remote control device may determine, based on the state update, other command signals than those received from the video streaming device. For example, if the state update indicates a mapping for a cable box associated with a television's HDMI 2 port (e.g., the cable box is being used for playback), then the remote control device may determine which control mapping to use when other user commands (e.g., button pushes, touch screen touches, etc.) are identified. If the state update indicates that the cable box is in use, the control mapping may indicate that channel button inputs correspond to channel command signals coded for the cable box. However, if the audio output for the cable box is controlled by a stereo receiver or sound bar, then volume button commands may correspond to command signals coded for the stereo receiver or sound bar. The state update may indicate the control mapping to use in a mapping table, and the mapping table may indicate which command codes for the remote control device to generate when a particular button or touch screen icon is pushed/touched, for example.

User commands for remote control devices may cause multiple actions to be taken by one or more devices in order to execute the commands. For example, if a user command is to play a particular video, state information such as the source of the requested video, the media input at a television or other output device which connects the output device to the source of the requested video, and the commands required for each relevant device to cause the video playback may be considered in determining the command signals needed to cause execute the actions. A user voice command to play a particular video (e.g., "Play House of Cards on Netflix") may result in a device determining the selected content (e.g., "House of Cards"), a source of the selected content (e.g., "Netflix"), an input associated with the source (e.g., and HDMI connection port associated with a streaming video device which provides Netflix content to a television), and for the commands appropriate to cause the playback. The actions may be executed using one or more command signals configured for and/or associated with the device providing the content, such as a command signal indicating a selection of the requested video and a command signal indicating a command to output the video to a particular input port (e.g., an HDMI port).

The source device of the video content may be associated with a control mapping that indicates which commands may be received at the remote control device, the devices to which those commands may map, and the command signals used to cause a device to execute the commands. The video source may have a mapping of directives/actions (e.g., select video content) to command signals coded for the video source device, and may have a mapping of volume commands (e.g., volume up or volume down) to command signals coded for a television, sound bar, stereo receiver, or speaker based on which device controls the volume when video is playing from the video source. If the directive is associated with commands to control the video source device, then the mapping may be used to determine which commands (e.g., button pushes, voice signals, gestures) received by a remote control device correspond to command signals for the video source, and which commands generate command signals for other devices.

As a result of embodiments of the disclosure, remote control devices may generate multiple signals based on a voice command rather than a user having to manually provide the commands and cause the remote control device to switch source codes based on which device is intended to be controlled. For example, rather than a user having to select a device with a remote control, provide inputs to control that device, then switch to another device so that other inputs may be provided to control the other device, the remote control may switch states and automatically map controls to devices so that the proper command signals are generated when a user provides command inputs. If the state mapping indicates that volume for a video streaming device is controlled by a stereo receiver or sound bar, the video streaming device can provide an updated state mapping to the remote control device to allow the remote control device to identify other control commands such as volume control commands to volume control signals designed for the stereo receiver or sound bar. The remote control device therefore may be universal in that it may be able to control multiple devices, and may reduce the number of command inputs required by a user to control different devices with the remote control device.

In one or more embodiments, the state of devices used in command signal mapping may be provided by a user and stored on a device. The state may be updated based on additional user inputs or by updates received from another device (e.g., a push). A remote control device may operate under one or more mappings based on which devices are being controlled, as indicated by the state. For example, channel and volume inputs on a remote control device may be mapped to command signals to a cable box. When the remote control device receives inputs intended to play video or audio on another device (e.g., a video streaming device, Blu-Ray player, gaming device, or the like), a new mapping may be determined. The new mapping may include video playback commands sent to the video providing device, and audio commands sent to a stereo receiver or sound bar.

In one or more embodiments, the state may be updated to allow a remote control device to generate the proper command signals for an active set of devices. For example, a volume command signal for a cable box may be different than a command signal for a television or sound bar. The different command signals may include different codes (e.g., infrared codes) programmed to be recognized by particular devices. The state may indicate a mapping and codes to be included in command signals when certain user inputs are recognized by the remote control device. For example, a state may indicate to a remote control device that certain inputs received by the remote control device may be mapped to certain codes to be used in command signals so that when an input is identified by a remote control device, the remote control device may determine the input or device associated with input and may generate a command signal based on the codes corresponding to the input or device.

In one or more embodiments, the state and mapping may indicate to a remote control device the command signals to send if a user provides an input in the future. For example, a voice command may result in a command signal to switch an input from HDMI 1 to HDMI 2, but rather than waiting for another command to increase the volume and then determining which device is to receive a volume command signal, the state may indicate the mapping of volume inputs on the remote control device to volume command signals coded for the device determined to be the audio controller when HDMI 2 is selected/enabled. This way, if a subsequent command on the remote control device is a volume command, the remote control already may be configured to provide volume commands to the proper audio output device rather than having to take additional time to recognize the individual command. Thus, user commands and latency may be reduced, for example.

In one or more embodiments, a device such as a video streaming device may receive from a remote control device indications of user inputs received by the remote control device (e.g., voice signals representing voice commands), and may facilitate the conversion of the user inputs into command signals by communicating state and mapping information to the remote control device. If a user input is received by the remote control device in the form of a voice command, a voice signal (e.g., voice data) representing the voice command may be sent by the remote control device to the device, which may send the voice signal to a remote server (e.g., a cloud server) for analysis. In this manner, the device may be connected to a wireless network not only to request and receive streaming video, but also to assist a remote control device in interpreting voice commands and directing the remote control device to generate command signals. The remote server may receive the voice signals (e.g., voice data), determine directives/actions and target devices associated with the voice signals, and may send the directives/actions to the device. The device may receive the directives/actions, and using logic may determine commands (e.g., IR codes) to perform the directives. The device may send the command signals and a state update to the remote control device to indicate the mapping of commands to command signals based on the state. The remote control device may generate and send the command signals provided by the device and may map other user commands to the correct command signals based on the state. The remote control device may send an indication to the device confirming receipt of the commands and state information.

In one or more embodiments, directives/actions may be associated with multiple actions. For example, multiple commands may be combined in macro to cause one or more actions to be performed. A macro may group multiple commands together in order to cause one or more actions. The commands may be ordered to cause certain operations. For example, sending a channel change command signal may not cause a channel change if a cable box is not first turned on. Therefore, a macro may include a command to turn on a device, and a command to change channels once the device is on. A device which receives a macro of commands may determine the command signals to execute the commands and may send those command signals to the remote control device so that the remote control device may send the command signals. If a video streaming device is connected to a stereo receiver so that both video and audio are rendered using a television, and a gaming console is connected to the stereo receiver with the audio rendered by surround sound speakers and the video is rendered by a projector, then a voice command such as "Switch to Xbox" may result in a macro including commands to switch video to an input for the projector and to switch audio to an input for the surround sound speakers. A macro may include a maximum number of commands (e.g., based on a size of the codes used in command signals). In one example, if a user provides a voice command to a remote control device to "Play Game of Thrones," a chain of actions and inputs used to execute the request may be included in a macro. The commands in a macro may be ordered to carry out execution of the request. For example, a macro to cause playback of Game of Thrones may include commands to turn on relevant devices, commands to switch device inputs, and commands to select Game of Thrones on a particular device.

The remote control device may include multiple emitters, such as light emitting diodes (LEDs). The emitters may be positioned differently within/on the remote control device to control command signals sent by the remote control device based on the orientation of the remote control device. For example, one emitter may be positioned at or near the top of a remote control so that when the remote control is held horizontally with the top of the remote control device pointed toward a device, the emitter may emit a command signal to the device. Another emitter may be positioned perpendicular to the other emitter (e.g., on a back side of a remote control device and facing the ground when the remote control is horizontal). When the remote control device is in a vertical position, the other emitter may be pointed toward the device which is to receive a command signal. Therefore, rather than sending a command signal with an emitter pointed away from a device, the remote control device may select a better emitter to send a command signal based on which emitter is more directly pointed at a device.

In one or more embodiments, the remote control device may determine which emitter to use to emit a command signal. The emitter selected to send a command signal may be set based on the type of command identified by the remote control device. For example, if voice commands for the remote control device are associated with a vertical position of the remote control device, then when the remote control devices identifies a voice command, the remote control device may use an emitter which faces outward when the remote control device receives a voice command rather than using an emitter which is pointed at the ceiling or the ground (e.g., in a direction parallel with gravity). If button pushes or touch screen touches are associated with a horizontal position of the remote control device, then the remote control device may use another emitter which is oriented at or near the top of the remote control device and is perpendicular to the direction of gravity when the remote control device identifies a button push or touch. The remote control device also may identify its orientation (e.g., vertical or horizontal based on the direction of gravity) and select an emitter. When the device crosses a threshold angle (e.g., 45 degrees from the direction of gravity), then the device may switch between horizontal and vertical orientations, and the emitters used with the respective orientations. The remote control device may identify directional movement (e.g., the top of the remote control device is moving upward or downward) and may select an emitter based on the movement. For example, if the top of the remote control device is moving upward, such may indicate movement to a vertical orientation, and therefore may indicate that an emitter for a vertical orientation should be used. If a remote control device is at a particular angle or within a range (e.g., from 30-60 degrees), then the remote control device may use multiple emitters to send a command signal.

In one or more embodiments, the remote control device may recognize that a user input was not properly executed and may adjust signal transmission by switching from one LED to another LED. For example, if a remote control device identifies a repeat command either as a consecutive command or as a command which was previously provided within a given time period, the remote control device may determine that a user is providing the same command because the previous command may not have been executed. The remote control device may store recent commands and the LED associated with sending the respective command signal so that the remote control device may resend a command signal with a different LED upon recognition of a repeat request.

In one or more embodiments, the remote control device may blink an LED to indicate that the device is processing commands, that a particular orientation of the remote control is desired for a command signal (e.g., to indicate to a user to orient or point the device a certain way for a given command signal), and to confirm when a command signal has been sent. Different command signals may be different colors. For example, LEDs may flash different colors to indicate a type of command signal or device for which a command signal is intended. This way, if a user sees a color not reserved for the intended signal, the user may recognize that an input was not interpreted correctly or that device settings may need to be updated. Similarly, the length of a flash may be used. To indicate that the remote control device should be oriented vertically (e.g., when receiving a voice command), the remote control device may flash one or more LEDs (e.g., an LED near the top of the remote control to indicate that the LED should be brought toward the user) and may use one color to indicate that the remote control should be rotated to a vertical orientation, and may use another color to indicate that the remote control should be rotated to a horizontal orientation. Instead of colors, different numbers of LED flashes may be used to indicate a proper or improper orientation of a remote control device.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates a process 100 for switching a state of a remote control device and sending command signals with the remote control device, in accordance with one or more example embodiments of the present disclosure.

Referring to FIG. 1, the process 100 may include a voice command (e.g., a voice utterance or phrase) being received at operation 102 from a human user 104 at a remote control device 106. At operation 108, the remote control device 106 may send a voice signal associated with the voice command to a device 110 (e.g., a video streaming device). At operation 112, the device 110 may send the voice signal to a remote server 114 (e.g., a cloud server).

At operation 116, the remote server 114 may determine one or more directives associated with the voice command. To determine the directives, the remote server 114 may consider a state of media devices which may be used (e.g., device 110, display 128, sound bar 130, gaming console or cable box 132). The state may be provided to the remote server 114 and stored. The state may indicate that the display 128 is using an HDMI 1 input port connected to the cable box 132, and that the device 110 is connected to an HDMI 2 input port of the display 128. If the voice command is associated with a command to play content using the device 110, then a directive may include switching the input port on the display 128 from HDMI 1 to HDMI 2, and another directive may include selecting Program X at the device 110.

At operation 118, the server 114 may send the directives to the device 110. At operation 120, the device 110 may convert the directives to commands to be used by the remote control device 106. For example, the device 110 may determine commands to execute the directives based on the state. If the state indicates that the device 110 is to provide content to the display 128, for example, then the device may determine the steps to provide the content to the display 128. If the state indicates that sound is to be controlled by the sound bar 130, then the device 110 may determine command signals for the remote control device 106 to use to activate and control the sound bar 130.

At operation 122, the device 110 may send the commands and a state update with mapping indicative of one or more command signals to be generated by the remote control device 106. The commands may be signals which, when sent to the relevant devices, cause the devices to perform the directives. This way, the device 110 may provide command signals to the remote control device 106 rather than the remote control device 106 having to determine the command signals. In addition, the state update may indicate a mapping which the remote control device 106 may use to map command signals based on the state of the device. For example, if the state indicates that volume is controlled through the sound bar 130, then the remote control device 106 may map volume inputs to volume command signals coded for the sound bar 130.

At operation 124, the remote control device 106 may determine and generate command signals to be sent (e.g., to the device 110, the display 128, the sound bar 130, and/or the cable box 132) to execute the directives associated with the voice command. For example, at operation 126, the remote control device 106 may send one or more media input command signals to the device 110, a display 128, and/or a sound bar 130. If the "Play Program X" voice command is associated with playing the cable box 132 (or a gaming console), and the cable box 132 outputs video through the display 128 and outputs audio through the sound bar 130, then a "Play Program X" voice command may result in a command signal for the sound bar 130 to select an input port connected to the cable box 132, and may result in a command signal for the display to select an input port connected to the cable box 132. The command signals may be provided by the device 110 rather than the remote control device 106 translating voice commands into command signals.

At operation 134, the remote control device 106 may send one or more video command signals to the device 110, the display 128, and/or the sound bar 130.

At operation 136, the remote control device 106 may send one or more audio command signals to the device 110, the display 128, and/or the sound bar 130. The one or more command signals may be used to control the device 110, the display 128, and/or the sound bar 130.

In one or more embodiments, voice command may be a command to cause playback of digital content (e.g., "Play Program X"). The server 114 may translate the audio of "Play Program X" into directives such as switching the input of the display 128 (e.g., to an HDMI 1 connector) to a connector for the device 110 because the device 110 may be responsible for outputting the Program X content to the display 128. The directives also may include video command signals, such as an indication of the selection of Program X intended for the device 110. The directives may include audio command signals, which may be for the display 128 or the sound bar 130 based on the settings indicated by the state and mapping. For example, if the state indicates a mapping of audio command signals to audio inputs (e.g., volume control commands) on the remote control device 106, then the remote control device 106 may determine that volume control commands correspond to command signals coded for the sound bar 130 or the display 128. The remote control device 106 may be configured to receive and generate the correct command signals for the correct devices based on the command "Play Program X" rather than the remote control device 106 requiring the user to switch states manually on the remote control device 106 to facilitate generation of the proper command codes for a given device command.

Figure 2:
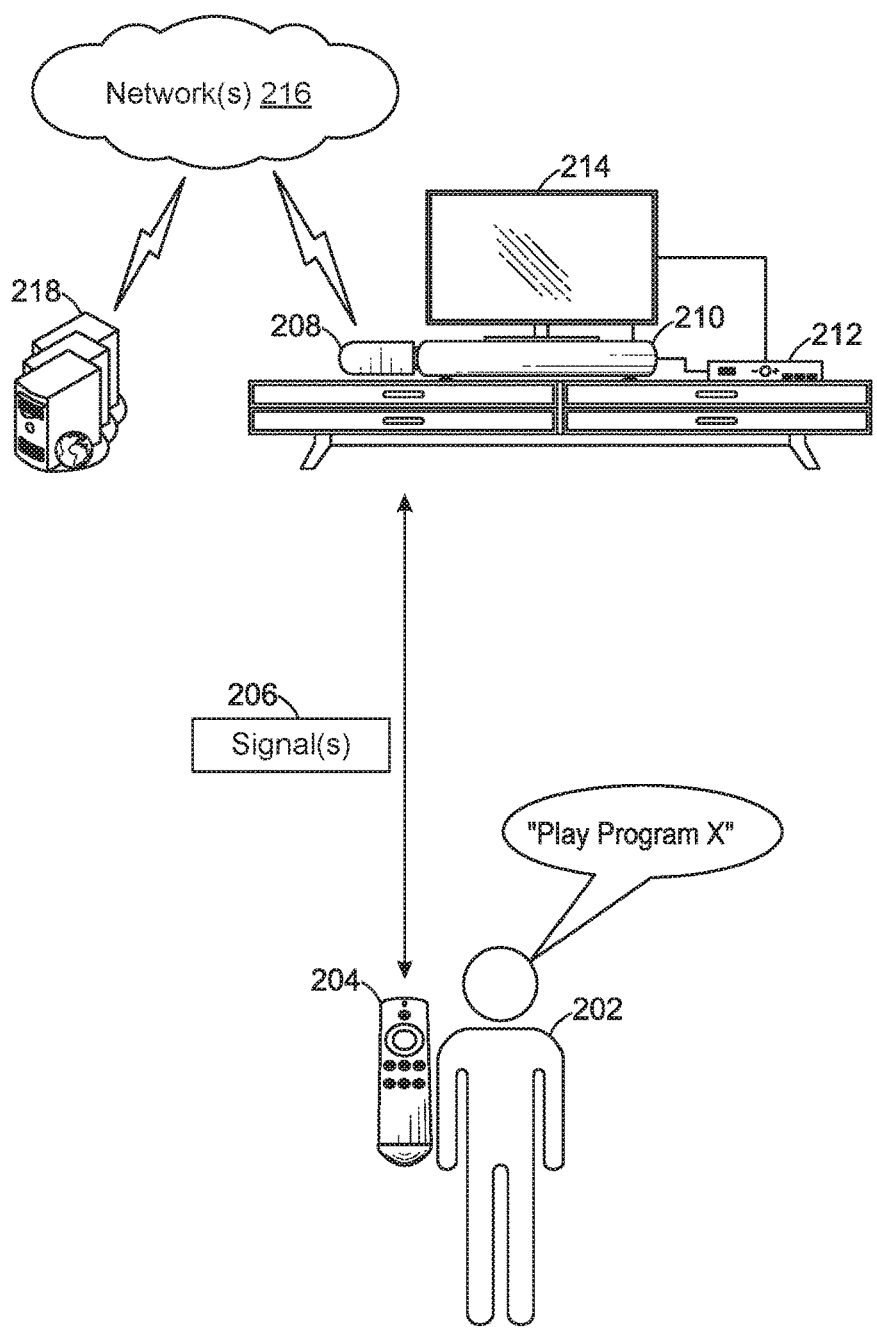
FIG. 2 illustrates a system for switching a state of a remote control device to control another device, in accordance with one or more example embodiments of the present disclosure.

FIG. 2 illustrates a system 200 for switching a state of a remote control device to control another device, in accordance with one or more example embodiments of the present disclosure.

Referring to FIG. 2, a user 202 of a remote control device 204 may cause the remote control device 204 to send one or more signals (e.g., signals 206) to one or more devices (e.g., device 208, sound bar 210, cable box 212, and display 214). The device 208 may be a video streaming device capable of communicating over one or more wireless networks 216 with one or more remote servers (e.g., cloud server 218) to translate signals received from the remote control device 206, and to request and receive content (e.g., streaming video and audio).

The device 208, sound bar 210, cable box 212, and display 214 may be configured in a variety of ways. For example, all sound from the device 208 and the cable box 212 may be output through the sound bar 210, or some sound may be output through the display 214. The cable box 212 may output video to the display 214. The device 208 may output video directly to the display 214 or through the sound bar 210 or some other receiver. The device 208, sound bar 210, cable box 212, and display 214 may be able to receive signals (e.g., command signals) from the remote control device 204, and may recognize the command signals based on codes (e.g., IR codes) assigned to the respective device. The command signals may indicate actions for the devices to perform, such as turning on and off, changing inputs, changing volume, changing channels, selecting content for playback, changing settings, or the like.

In one or more embodiments, the configurations/settings associated with the device 208, sound bar 210, cable box 212, and display 214 may be stored on the remote control device 204 and/or the device 208. For example, the user 202 may use the remote control device 206 to input preferred video and audio settings so that the remote control device 204 and/or the device 208 may map commands which may be received by the remote control device 204 to command signals coded for the devices intended to receive the command codes. For example, if the user 202 inputs the device 208 as connected to HDMI 1 and the cable box as connected to HDMI 2 on the display 210, then when content from the device 208 is selected, the remote control device 204 may generate command signals for the device 208 (e.g., a command signal to change the input of the display 210 to HDMI 1). The cloud server 214 may push configuration updates at any given time to the device 208, which may provide the updates to the remote control device 204 in the form of state updates indicating the mapping of commands to command signals.

In one or more embodiments, the sound bar 210, cable box 212, and display 214 may include one or more inputs. The inputs may be connectors or connection ports, such as HDMI, USB, composite audio/video, optical audio, or the like. The sound bar 210, cable box 212, and display 214 may be able to switch between inputs (e.g., from HDMI 1 to HDMI 2) in response to command codes identified from the remote control device 204.

In one or more embodiments, the device 208 may be any type of device capable of receiving signals (e.g., voice signals, command signals, or the like) from the remote control device 204, and capable of communicating with one or more remote servers (e.g., cloud server 218). The device 208 may include an HDMI or other type of connector capable of connecting the device 208 to the display 214, the sound bar 210, or any other device capable of receiving media content for playback. The device 208 may provide digital content for playback, and may facilitate the control of the states of the remote control device 204 to ensure that the remote control device 204 properly response to user inputs. Thus, the device 208 may facilitate translation of user commands received by the remote control device 206, and those commands may be associated with controlling the device 208 (e.g., selecting video offered/attainable by the device 208) and/or with controlling other devices.

Any of the communications networks 216 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 216 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 216 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 3:
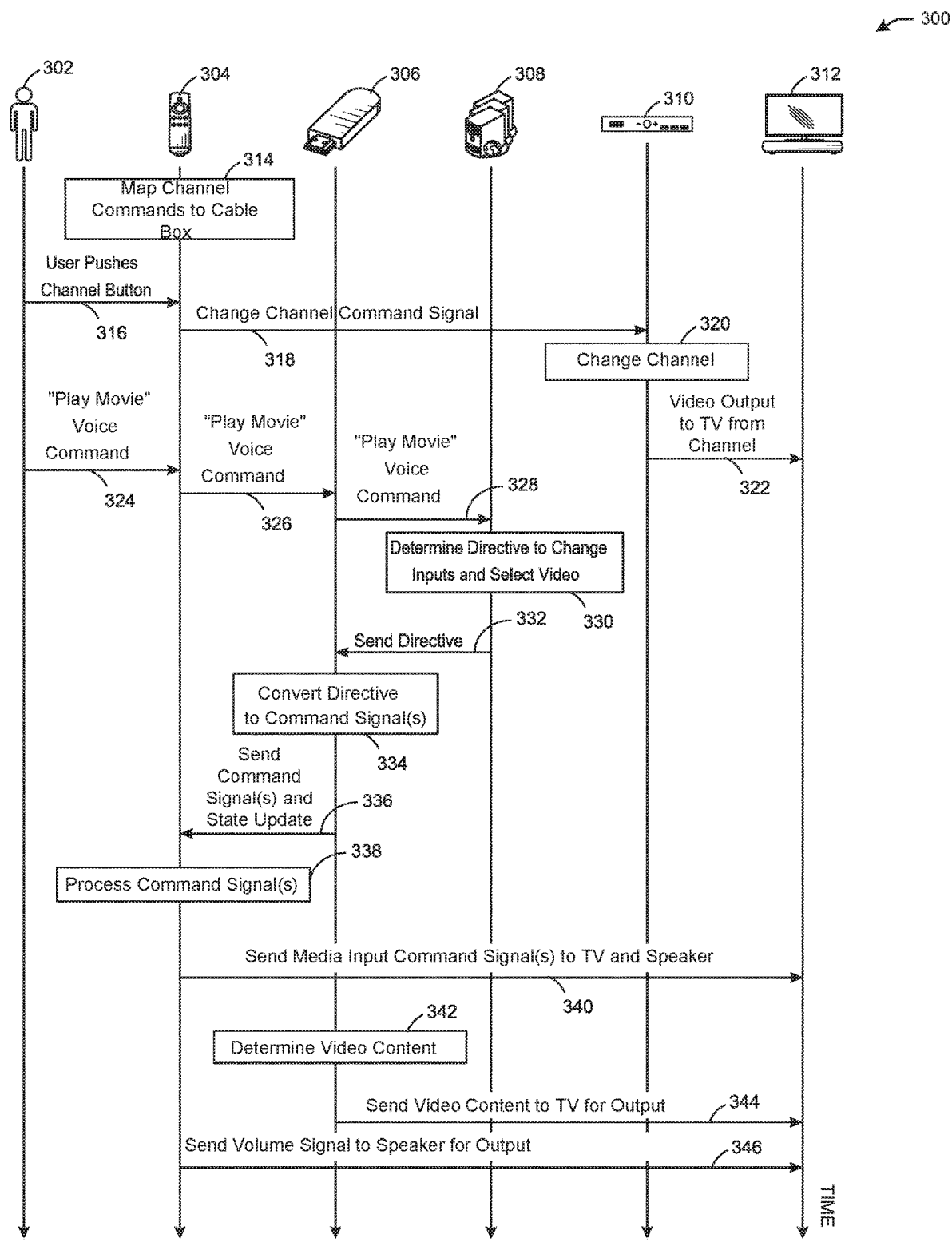
FIG. 3 illustrates a process for controlling a state of a remote control device to control multiple other devices, in accordance with one or more example embodiments of the present disclosure.

FIG. 3 depicts a process 300 for controlling a state of a remote control device to control multiple other devices, in accordance with one or more example embodiments of the present disclosure.

Referring to FIG. 3, the process 300 may include communication between a user 302, a remote control device 304, a device 306 (e.g., a video streaming device), a server 308 (e.g., a cloud server), a cable box 310, and a display 312.

At operation 314, the remote control device 304 may map channel commands to the cable box 310. For example, the remote control device 304 may be operating in a state in which channel inputs received by the remote control device 304 may correspond to command signals coded for the cable box 310. At operation 316, when the user 302 pushes a channel button (or touchscreen button) on the remote control device 304, the remote control device 304 may translate the channel button push into a change channel command, and may send the change channel command to the cable box 310 at operation 318. The channel change command signal may cause the cable box 310 to tune to another channel at operation 320, and the cable box 310 may send video output from the channel to the display 312 at operation 322 for output.

The remote control device 304 may receive other inputs from the user 302 which may cause the remote control device 304 to change states. At operation 324, the user 302 may provide a "Play Movie" voice command to the remote control device 304. The remote control device 304 may send the Play Movie voice command to the device 306 at operation 326, which may send the Play Movie voice command to the server 308 at step 328.

The server 308 may, at operation 330, determine one or more directives associated with the Play Movie voice command, along with a target device (e.g., the device 306) associated with executing the directives. The directives may including changing inputs at the display 312. For example, if the display 312 is rendering content provided by the cable box 310, the input of the display 312 may be changed from one connector (e.g., HDMI 1) to another connector (e.g., HDMI 2) to allow for playback of content provided by the device 306 because the device 306 may be connected to the display 312 via HDMI 2. The directives may also include a video selection directive to cause the device 306 to select the Movie for playback. The directives may be separate or grouped together as a macro so that the commands used to cause the directives may be executed by the remote control device 304 and/or the device 306 using command codes as explained further below.

At operation 332, the server 308 may send the one or more directives to the device 306. At operation 334, the device 306 may convert the directives to the proper command signals (e.g., IR commands). The device 306 may determine, based on the directives, the target devices or inputs associated with the directives. For example, if the switch input directive is associated with HDMI 2 on the display 312 and the device 306 is connected to HDMI 2, then the device 306 may determine that the device 306 is active and may receive certain command signals from the remote control device. If a state associated with controlling the device 306 indicates that video and audio are output from the device 306 to the display 312 (and any connected speaker output), then mapping indicated by the state may indicate to the remote control device 304 that audio and video commands (e.g., selection of video, volume change inputs) may be translated into command signals coded for the device 306. If the directive indicates that the device 306 is to provide content to the display 312, then the device 306 may determine the steps for providing the content rather than instructing the remote control device 304 to provide a command signal to the device 306 indicating the command.

At operation 336, the device 306 may send the command signals (e.g., switch input command signal) and the state update to the remote control device 304. This way, the remote control device 304 receives command signals used to control other devices from another device rather than translating voice commands locally. For example, there may be many more voice commands than possible button push commands because the number of buttons on the remote control device 304 may be more limited. To allow for more commands by using voice commands without the remote control device 304 having to store such a large amount of commands, the translation of voice commands may be performed remotely, and the command signals and mapping for other commands based on a media state may be provided to the remote control device 304.

At operation 338, the remote control device 304 may process command signals, and may map volume commands to the display 312 and its speakers. The switch input command may be associated with the directives used to response to the "Play Movie" voice command, but the volume commands may be determined and mapped based on the settings/state associated with the devices being controlled. For example, if the audio settings for the device 306 indicate that sound for content provided by the device 306 is to be played at a speaker system (e.g., sound bar 210 of FIG. 2), then the remote control device 304 may map volume inputs (e.g., volume up and volume down inputs) to respective volume command signals coded to control the speaker system. This way, if the user 302 adjusts volume while watching the Movie from the device 306, the remote control device 304 automatically converts the volume signals to the command signals for the speaker system.

At operation 340, the remote control device 304 may send the media input command signal(s) to the display 312 to cause the display 312 to switch to the proper input to receive video from the device 306. At operation 342, the device 306 may determine video content to send to the display 312. The device 306 may identify a directive to select and provide content to the display 312, and may identify that the directive is associated with the device 306 so that the device 306 may perform operations to cause the directive. At operation 344, the device 306 may send the video content for the Movie to the display 312. For example, the video content may be downloaded from the server 308 or another server (e.g., a content server), or may be stored locally on the device 306. To control volume, at operation 346 the remote control device 304 may send one or more volume command signals to the speaker system (e.g., sound bar 210 of FIG. 2) to control the volume output.

While the process 300 of FIG. 3 refers to specific states, mappings, and command signals based on given media configurations, other combinations of commands, command signals, and states may use a similar process in which the device 306 receives a voice command from the remote control device 304, sends the voice command to the server 308, receives one or more directives, converts the directives into commands, and sends the commands and a state update to the remote control device 304 to map user inputs to command signals.

FIGS. 4A and 4B schematically illustrate an example remote control device, in accordance with one or more example embodiments of the present disclosure.

Referring to FIG. 4A, a user 402 may operate the remote control device 404, which may include one or more components, such as processing circuitry 406, one or more memory devices 408, one or more microphones 409, one or more input/output interfaces 410, one or more network interfaces 412, one or more transceivers 414, one or more accelerometers 415, one or more emitters 416 (e.g., including emitter 416A and emitter 416B), storage 418 (e.g., which may include one or more operating systems (O/S) 420, one or more database management systems (DBMS) 422, one or more communication modules 424, and one or more mapping and signal modules 426), one or more controller 428, and a power supply 430. The remote control device 404 may communicate with devices such as a display 432 and a sound bar 434 using the emitters 416. As shown in FIG. 4A, the remote control device 404 is in a vertical orientation and the user 402 is issuing a voice command. As shown in FIG. 4B, the remote control device 404 is in a horizontal orientation and the user 402 is providing a manual command (e.g., a button push or touch screen touch).

In one or more embodiments, the remote control device 404 may determine whether to send a command signal with emitter 416A or 416B (or any other emitters associated with the remote control device 406). The emitters 416 may be LEDs or any other device capable of sending electrical signals such as infrared signals. The emitter 416A and the emitter 416B may be positioned in different orientations from one another. For example, when the remote control device 404 is in a vertical or near vertical orientation, the emitter 416B may be aimed closer to the direction of the display 432 and/or the sound bar 434. When the remote control device 404 is within 45 degrees of the direction of gravity (or some other threshold value), then the remote control device 404 may be considered in a vertical orientation. If the remote control device 404 is more than 45 degrees from the direction of gravity (or some other threshold value), then the remote control device 404 may be considered in a horizontal orientation. If the remote control device 404 is at exactly 45 degrees from the direction of gravity (or is within a threshold range such as between 30-60 degrees), then a default emitter may be selected, the most recently used emitter may be selected, or both emitters may be selected to send a command signal. The emitter 416B may be positioned so that its signal output is perpendicular to the vertical orientation of the remote control device 404 (e.g., perpendicular to the direction of gravity). The emitter 416A may be positioned so that its signal output is parallel to the vertical orientation of the remote control device 404 (e.g., parallel to the direction of gravity), and therefore not in the direction of the display 432 and/or sound bar 434 relative to the remote control device 404. Therefore, the remote control device 404 may determine that, when in the vertical orientation (e.g., closer to vertical than horizontal), the emitter 416B may be used to send command signals. If certain user commands, such as voice commands, are associated with the vertical orientation (e.g., based on historical use or preset conditions), then a command signal resulting from a voice command may be sent using the emitter 416B.

In one or more embodiments, if the remote control device 404 determines that it is more in the horizontal orientation than the vertical orientation, then the remote control device 404 may send command signals with the emitter 416A. If certain commands (e.g., button pushes or touch inputs) received by the remote control device 404 may be associated with the horizontal orientation (e.g., based on historical use or preset conditions), then a command signal resulting from a button push or touch input command may be sent using the emitter 416A.

The remote control device 404 may include any portable device capable of receiving user inputs such as button pushes, touchscreen inputs, voice commands, gestures, and the like, and translating the user inputs into command signals used to control other devices (e.g., the display 432 and the sound bar 434). The remote control device 404 may send one or more command signals using the one or more emitters 416. The remote control device 404 may send voice signals detected by the one or more microphones 409 to be analyzed remotely.

The display 432 may be, for example, an electrophoretic display, an electrowetting display, a liquid crystal display (LCD), an organic light-emitting diode, (OLED) display, or the like. The sound bar 434 may be any type of speaker capable of receiving signals wired or wirelessly.

The storage 418 may include removable storage and/or non-removable storage including, but not limited to, magnetic storage, optical disk storage, and/or tape storage. The storage 418 may provide non-volatile storage of computer-executable instructions and other data. The storage 418, removable and/or non-removable, is an example of computer-readable storage media (CRSM) as that term is used herein.

The storage 418 may store computer-executable code, instructions, or the like that may be executable by the processing circuitry 406 to cause the processing circuitry 406 to perform or initiate various operations (e.g., operations associated with computer-executable instructions for the one or more communication modules 424 and/or the one or more mapping and signal modules 426). The storage 418 may additionally store data that may be copied for use by the processing circuitry 406 during the execution of the computer-executable instructions. Moreover, output data generated as a result of execution of the computer-executable instructions by the processing circuitry 406 may be copied to the storage 418 for non-volatile storage.

More specifically, the storage 418 may store one or more program module(s), applications, engines, computer-executable code, scripts, or the like. Some or all of these module(s) may be or include sub-module(s). Any of the components depicted as being stored in the storage 418 may include any combination of software, firmware, and/or hardware. The software and/or firmware may include computer-executable code, instructions, or the like that may executed by one or more of the processing circuitry 406. Any of the components depicted as being stored in the storage 418 may support the functionality described in reference to the corresponding components named earlier in this disclosure.

The storage 418 may further store various types of data utilized by the components of the remote control device 404. Any data stored in the storage 418 may be used by the processing circuitry 406 in executing computer-executable code. In addition, any data depicted as being stored in the storage 418 may potentially be stored in one or more datastore(s). The datastore(s) may include, but are not limited to, databases (e.g., relational, object-oriented, etc.), file systems, flat files, distributed datastores in which data is stored on more than one node of a computer network, peer-to-peer network datastores, or the like.

The storage 418 may store the one or more communication modules 424 and the one or more mapping and signal modules 426. The one or more communication modules 424 may provide executable code for identifying commands received by the remote control device 404, sending the commands for translation, receiving commands, states, directives, and the like, and causing the sending of command signals using the emitters 416. The one or more mapping and signal modules 426 may provided executable code for determining a state for the remote control device 404, a mapping associated with the state, and command signals which correspond to user inputs and the respective devices intended to perform actions associated with the user inputs.

The processing circuitry 406 may be configured to access the storage 418 and execute the computer-executable instructions loaded therein. For example, the processing circuitry 406 may be configured to execute computer-executable instructions of the various program module(s), applications, engines, or the like of the remote control device 404 to cause or facilitate various operations to be performed in accordance with one or more embodiments of the disclosure. The processing circuitry 406 may include any suitable processing unit capable of accepting data as input, processing the input data in accordance with stored computer-executable instructions, and generating output data. The processing circuitry 406 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an Image Signal Processor (ISP), a digital signal processor (DSP), and so forth. Further, the processing circuitry 406 may have any suitable microarchitecture design that includes any number of constituent components such as, for example, registers, multiplexers, arithmetic logic units, cache controllers for controlling read/write operations to cache memory, branch predictors, or the like. The microarchitecture design of the processing circuitry 406 may be capable of supporting any of a variety of instruction sets.

The remote control device 404 may further include one or more network interface(s) 412 via which the remote control device 404 may communicate with any of a variety of other systems, platforms, networks, devices, and so forth. The network interface(s) 412 may enable communication, for example, with one or more wireless routers, one or more host servers, one or more web servers, and the like via one or more networks.

The transceivers 414 may include any suitable type of transceiver depending, for example, on the communications protocols used to transmit or receive signals. The transceivers 414 may additionally, or alternatively, include a Wi-Fi transceiver configured to transmit or receive signals in accordance with established standards and protocols. The transceivers 414 may include any suitable radio component(s) for transmitting or receiving signals in a bandwidth and/or channels. The transceivers 414 may include any known receiver and baseband suitable for communicating via the communications protocols utilized by the remote control device 404. The transceivers 414 may further include a low noise amplifier (LNA), additional power signal amplifiers (PA), an analog-to-digital (A/D) converter, one or more buffers, a digital baseband, or the like.

It should be appreciated that the program module(s), applications, computer-executable instructions, code, or the like depicted in FIG. 4 as being stored in the storage 418 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote control device 404, and/or hosted on other computing device(s) accessible via one or more networks, may be provided to support the functionality provided by the program module(s), applications, or computer-executable code depicted in FIG. 4 and/or additional or alternate functionality. Further, functionality may be modularized differently such that processing described as being supported collectively by the collection of program module(s) depicted in FIG. 4 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 4 may be implemented, at least partially, in hardware and/or firmware across any number of devices.

It should further be appreciated that the remote control device 404 may include alternate and/or additional hardware, software, or firmware components beyond those described or depicted without departing from the scope of the disclosure. More particularly, it should be appreciated that software, firmware, or hardware components depicted as forming part of the remote control device 404 are merely illustrative and that some components may not be present or additional components may be provided in various embodiments. While various illustrative program module(s) have been depicted and described as software module(s) stored in the storage 418, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

The remote control device 404 may further include one or more buses 417 that functionally couple various components of the remote control device 404. The bus(es) 417 may include at least one of a system bus, a memory bus, an address bus, or a message bus, and may permit the exchange of information (e.g., data (including computer-executable code), signaling, etc.) between various components of the remote control device 404. The bus(es) 417 may include, without limitation, a memory bus or a memory controller, a peripheral bus, an accelerated graphics port, and so forth. The bus(es) 417 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 408 of the remote control device 404 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 408 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 408 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The storage 418 may include removable storage and/or non-removable storage including, but not limited to, magnetic storage, optical disk storage, and/or tape storage. The storage 418 may provide non-volatile storage of computer-executable instructions and other data. The memory 408 and the storage 418, removable and/or non-removable, are examples of computer-readable storage media (CRSM) as that term is used herein.

The storage 418 may store computer-executable code, instructions, or the like that may be loadable into the memory 408 and executable by the processor(s) 406 to cause the processor(s) 406 to perform or initiate various operations. The storage 418 may additionally store data that may be copied to the memory 408 for use by the processor(s) 406 during the execution of the computer-executable instructions. Moreover, output data generated as a result of execution of the computer-executable instructions by the processor(s) 406 may be stored initially in the memory 414, and may ultimately be copied to the storage 418 for non-volatile storage.

More specifically, the storage 418 may store one or more operating systems (O/S) 420; one or more database management systems (DBMS) 422; and one or more program module(s), applications, engines, computer-executable code, scripts, or the like such as, for example, the one or more communication module(s) 424 and the one or more mapping and signal modules 426. Some or all of these module(s) may be or include sub-module(s). Any of the components depicted as being stored in the storage 418 may include any combination of software, firmware, and/or hardware. The software and/or firmware may include computer-executable code, instructions, or the like that may be loaded into the memory 408 for execution by one or more of the processor(s) 406. Any of the components depicted as being stored in the storage 418 may support the functionality described in reference to the corresponding components named earlier in this disclosure.

The storage 418 may further store various types of data utilized by the components of the remote control device 404. Any data stored in the storage 418 may be loaded into the memory 408 for use by the processor(s) 406 in executing computer-executable code. In addition, any data depicted as being stored in the storage 418 may potentially be stored in one or more datastore(s) and may be accessed via the DBMS 422 and loaded in the memory 408 for use by the processor(s) 406 in executing computer-executable code.

Referring now to other illustrative components depicted as being stored in the storage 418, the O/S 420 may be loaded from the data storage 418 into the memory 408 and may provide an interface between other application software executing on the remote control device 404 and the hardware resources of the remote control device 404. More specifically, the O/S 420 may include a set of computer-executable instructions for managing the hardware resources of the remote control device 404 and for providing common services to other application programs (e.g., managing memory allocation among various application programs). In certain example embodiments, the O/S 420 may control execution of the other program module(s) to dynamically enhance characters for content rendering.

The DBMS 422 may be loaded into the memory 408 and may support functionality for accessing, retrieving, storing, and/or manipulating data stored in the memory 408 and/or data stored in the storage 418. The DBMS 422 may use any of a variety of database models (e.g., relational model, object model, etc.) and may support any of a variety of query languages. The DBMS 422 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the remote control device 404, the input/output (I/O) interface(s) 410 may facilitate the receipt of input information by the remote control device 404 from one or more I/O devices as well as the output of information from the remote control device 404 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote control device 404 or may be separate. The I/O devices may further include, for example, any number of peripheral devices such as data storage devices, printing devices, and so forth. The I/O interface(s) 410 may also include an interface for an external peripheral device connection such as universal serial bus (USB), micro-USB, FireWire, Thunderbolt, Ethernet port or other connection protocol that may connect to one or more networks.

The remote control device 404 may further include one or more network interface(s) 412 via which the remote control device 404 may communicate with any of a variety of other systems, platforms, networks, devices, and so forth. The network interface(s) 412 may enable communication, for example, with one or more wireless routers, one or more host servers, one or more web servers, and the like via one or more networks.

The controller(s) 428 may be any microcontroller or microprocessor configured to control one or more operations of the remote control device 404. The power supply 430 may be a battery, such as a lithium-ion battery. The power supply 430 may be provided power from a power receptacle or other power charging device.

The one or more accelerometers 415 may measure acceleration of the remote control device 404. The one or more accelerometers 415 may be motion input, free-fall, capacitive, piezoelectric resistive, laser accelerometer, low frequency, magnetic induction, optical, quantum, resonance, or any other type of accelerometer or sensor capable of detecting device orientation, motion, or the like. Data detected by the one or more accelerometers 415 may be used to identify when the remote control device 404 is more vertical than horizontal, or more horizontal than vertical. Other switching mechanisms may be used instead of or in conjunction with the one or more accelerometers 415 to determine device orientation. Logic also may be used to determine whether the remote control device 404 is more likely to be in a particular orientation based on identified commands, past usage, and the like.

Figure 5:
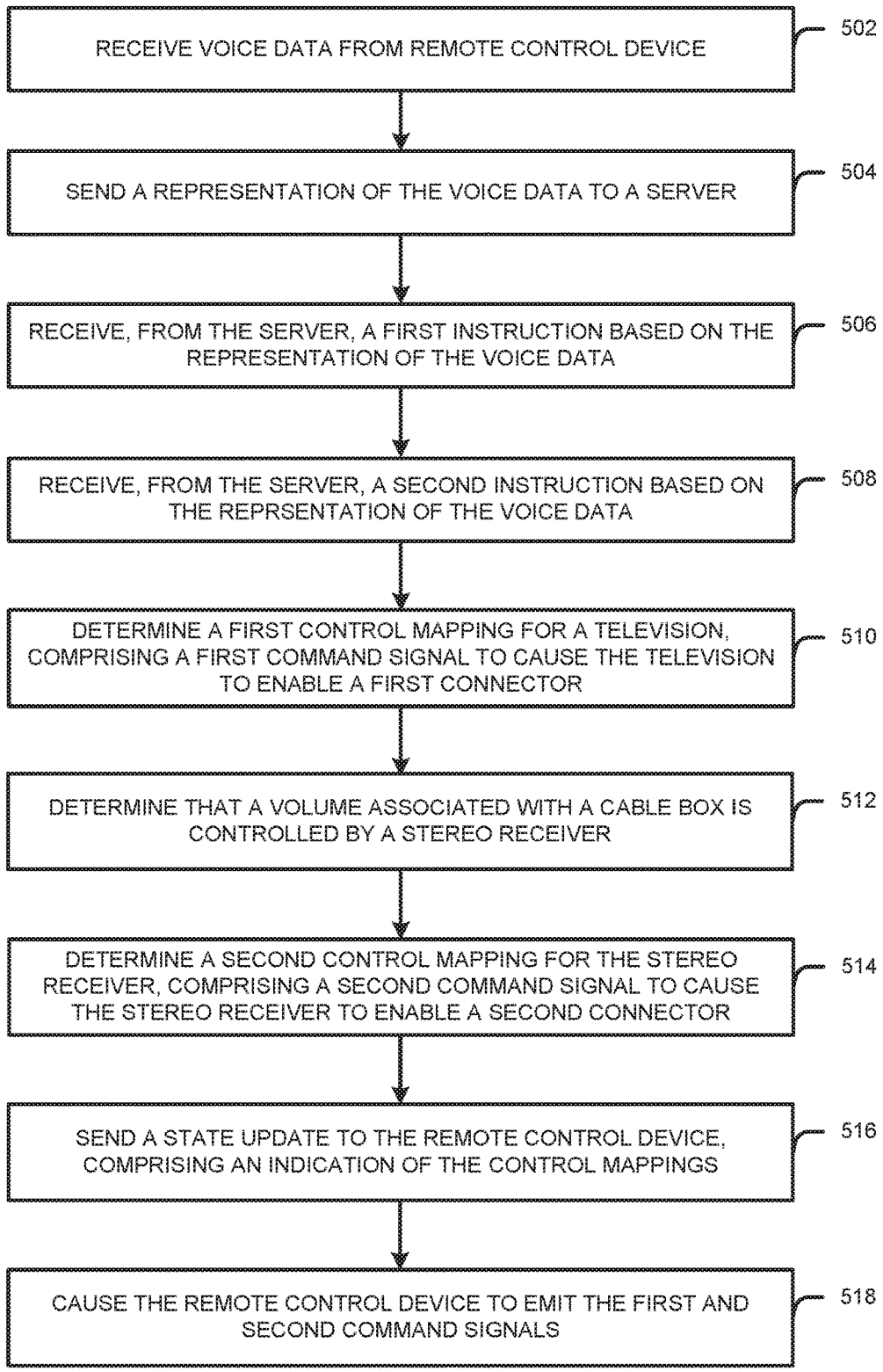
FIG. 5 illustrates a flow diagram for a process for switching a state of a remote control device to control another device, in accordance with one or more example embodiments of the present disclosure.

FIG. 5 illustrates a flow diagram for a process 500 for switching a state of a remote control device to control another device, in accordance with one or more example embodiments of the present disclosure.

At block 502, processing circuitry of a device (e.g., the device 110 of FIG. 1) may receive voice data from a remote control device (e.g., the remote control device 106 of FIG. 1). The voice data may represent or be one or more voice commands received by the remote control device from a human user (e.g., user 104 of FIG. 1) who intended the voice data to command the remote control device to signal to one or more other devices to perform one or more actions, such as turning devices on or off, changing media inputs, changing channels, adjusting volume, changing settings, selecting content for playback, and the like.

At block 504, the processing circuitry of the device may cause the device to send a representation of the voice data to a server (e.g., server 114 of FIG. 1). The representation of voice data may include the received voice data, a modified version of the voice data, a portion of the voice data, the voice data plus additional data, etc. The server may receive the voice data and may analyze the voice data to determine one or more instructions and target devices associated with carrying out the directives. For example, the voice data may have indicated a user's selection of video content, such as a movie or program, for playback. The instructions associated with the playback of the selected content may include switching the media input of a device (e.g., display 128 and/or sound bar 130 of FIG. 1) to cause playback of the selected content. The device may be a target device or multiple target devices, so the commands which may be used to cause the execution of the instruction may be coded for the device(s). For example, if voice data is associated with playing video from a cable box, gaming console, or other video streaming device, the commands may be coded for the device intended to provide the video to a display such as a television.

At block 506, the processing circuitry of the device may receive a first signal received from the server. The signal may indicate a first action/directive determined by the server. The first signal may include a first instruction corresponding to the voice data. The instruction may include a single command or a macro of commands. The instruction may include a command to enable a connector (e.g., HDMI 1) of a television (e.g., display 128 of FIG. 1). The connector may be associated with a device (e.g., a cable box) which is to provide video to the television. For example, if a voice data indicates a command to play content from a particular channel associated with a cable box, then the instruction may indicate the connector of a display for the video, and may indicate a connector for the audio if the audio is provided by a different device than the device which plays video (e.g., if the video is output by a television and the audio is provided by a stereo or sound bar separate from the television speakers).

At block 508, the processing circuitry of the device may receive a second signal received from the server. The signal may indicate a second instruction determined by the server. The instruction may include a command to cause a stereo receiver (e.g., sound bar 130 of FIG. 1) to enable a connector. The connector may be associated with a device (e.g., a cable box) which is to provide audio to the stereo receiver. The instruction may include other commands such as activating relevant devices. For example, if a television is used to output the selected video for display, then a power on command for the television may be included. If a sound bar is used to output audio for the selected video, then the instruction may include a command to turn on a sound bar. The instruction may include commands for selecting video. For example, a video streaming device may receive the instruction and recognize that the instruction is indicating that the video streaming device is to select and provide a particular video.

At block 510, the processing circuitry of the device may determine a first control mapping for the television. The control mapping may include a command signal to cause the television to enable a first connector. The device may use state information to map the action/directive associated with causing the television to enable the connector to a command signal which, when received by the television, may cause the television to enable the connector.

At block 512, the processing circuitry of the device may determine that a volume associated with the cable box is controlled by a stereo receiver. The state information may indicate that volume from the cable box is output to the stereo receiver, and therefore volume control commands may be coded for the stereo receiver. If the state information indicates a particular mapping (e.g., based on which devices are active and providing/rendering/controlling content), then the mapping may be used by the device to determine that commands for functions may be coded for particular devices. If a cable box, gaming console, streaming device, sound bar, television, stereo receiver, etc. are used to provide selected content or control the video and/or audio output, then the device may determine which devices are controlling which functions, and therefore may determine which mapping(s) to use to associated commands with command signals.

At block 514, the processing circuitry of the device may determine a second control mapping for the stereo receiver. The control mapping for the stereo receiver may include a command signal to cause the stereo receiver to enable a second connector. For example, the connector may connect the stereo receiver to the cable box so that the cable box may provide audio to the stereo receiver. The mapping may indicate not only command signals associated with a received voice command, but also other commands which could be used to control devices associated with executing a voice command. For example, if a voice command is associated with playing content from a streaming video device, and the streaming video device outputs audio or video through a stereo receiver, then the device may identify that the stereo receiver controls functions such as sound and video output, and the control mapping may indicate that some commands at the remote control device should be mapped to command signals for the stereo receiver.

At block 516, the processing circuitry of the device may cause the device to send a state update indication to the remote control device. The state update may indicate the control mappings associated with the television, cable box, and stereo receiver. The state update may indicate to the remote control device which mappings to use to generate command signals. For example, a mapping may indicate to the remote control device that a volume command may map to a command signal coded to control the stereo receiver.

At block 518, the processing circuitry of the device may cause the remote control device to transmit/emit the first and second command signals. To cause the remote control device to emit the command signals, the device may emit the command signals to the remote control device for use. The remote control device may use one or more LEDs to emit the received command signals based on the device's orientation and/or the type of command signal emitted.

Figure 6:
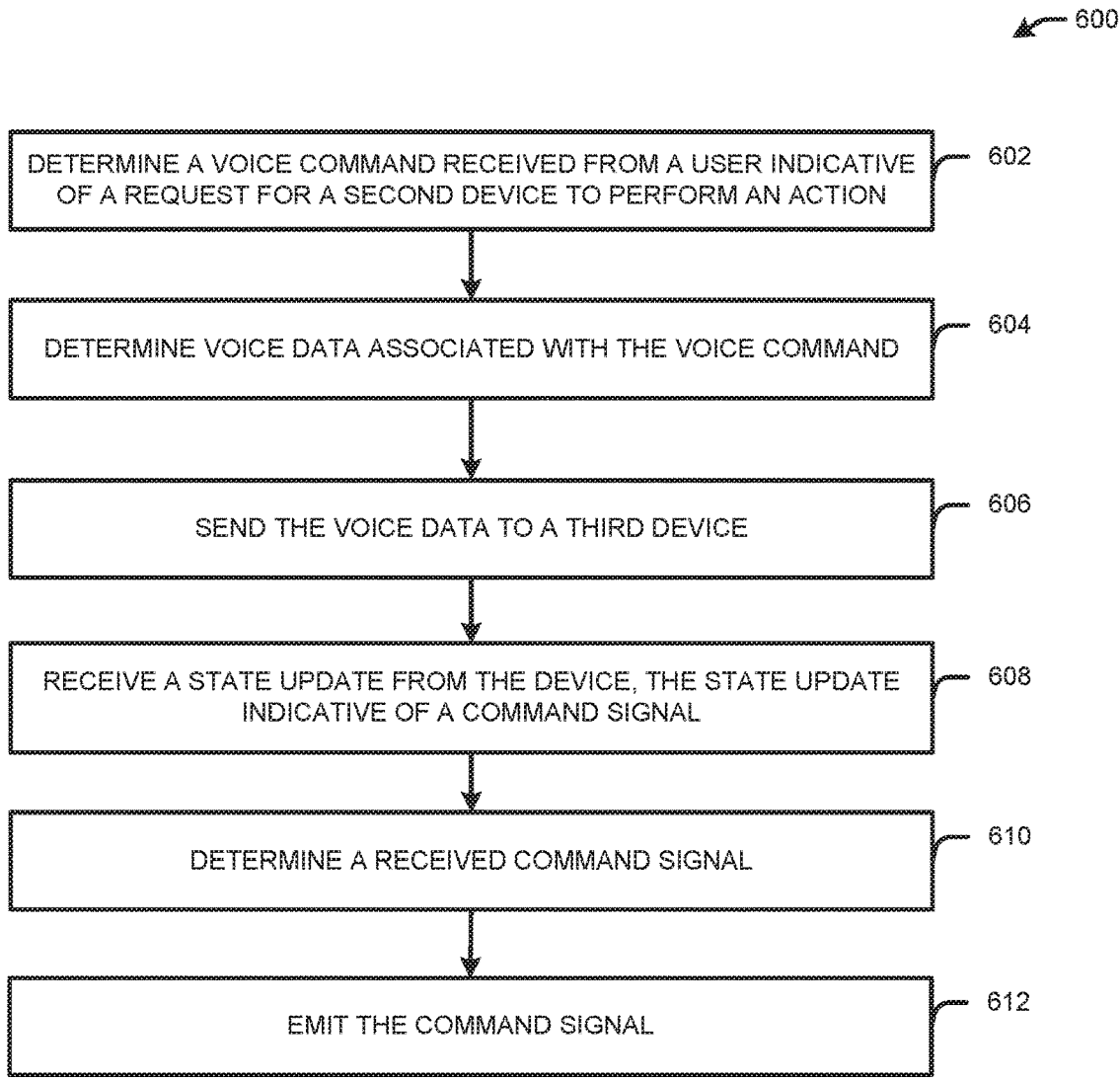
FIG. 6 illustrates a flow diagram for a process for switching a state of a remote control device to control another device, in accordance with one or more example embodiments of the present disclosure.

FIG. 6 illustrates a flow diagram for a process 600 for switching a state of a remote control device to control another device, in accordance with one or more example embodiments of the present disclosure.

At block 602, processing circuitry of a remote control device (e.g., the remote control device 106 of FIG. 1) may determine a voice command received from a user (e.g., user 104 of FIG. 1). The voice command may be indicative of a request for the remote control device to control another device (e.g., display 128 and/or sound bar 130 of FIG. 1). For example, the voice command may indicate a request to cause another device to perform an action by sending one or more command signals to the other device. The command may indicate a selection of content for playback, an adjustment of volume, a change of channels, a change of device settings, a change of input, or the like.

At block 604, the processing circuitry of the remote control device may determine voice data associated with the voice command. For example, a microphone (e.g., microphone 409 of FIG. 4) may capture the voice command, and the device may translate the voice command into voice data.

At block 606, the processing circuitry of the remote control device may cause the device to send the voice data to another device (e.g., device 110 of FIG. 1) for translation. This way, the translation of sounds captured by the device may be outsourced to another device which may provide indication of how the remote control device may respond to the voice command.

At block 608, the processing circuitry of the remote control device may receive a state update from the other device. The state update may be determined by the other device based on one or more directives/instructions that the other device may have received from a third device (e.g., server 114 of FIG. 1). The other device may convert the directives to command signals which the remote control device may use to control other devices. The state update may indicate a mapping of a command (e.g., a volume command, content selection command, switch input command, or the like) to generation of a command signal to send to the device to be controlled. The state update may be indicative of a command signal for the device to emit.

At block 610, the processing circuitry of the remote control device may determine the command signal received from the other device. For example, if the received command is a switch input command, the mapping may indicate that the command signal generated to cause a device to switch inputs may be coded for a particular device intended to receive the command signal. If the received command is a volume command, then volume up and down inputs identified at the remote control device may cause generation of volume command signals for a device which controls volume based on the mapping and configuration of devices used to cause playback of selected content. The mapping may indicate which devices may receive command signals based on user inputs. For example, if the command signal received from the other device is associated with a mapping which indicates that volume signals are to be sent to a stereo receiver, then volume inputs received by the device may map to command codes to send to the stereo receiver to control volume.

At block 612, the processing circuitry of the remote control device may cause the remote control device to emit the command signal to another device. The command signal may include an IR code specific to device configured to identify the command signal and perform a corresponding action. This way, the remote control device may receive command signals from another device, and those command signals may be emitted to the device which provided the command signals and/or to other devices. When a user's voice provides an indication of a command associated with one or more actions to be performed by one or more devices, the remote control device may be provided corresponding command signals to emit to identified devices intended to receive the command signals to cause the desired actions, and may be provided command signals to map to inputs which may be received at the remote control device to control playback under the updated state.

Figure 7:
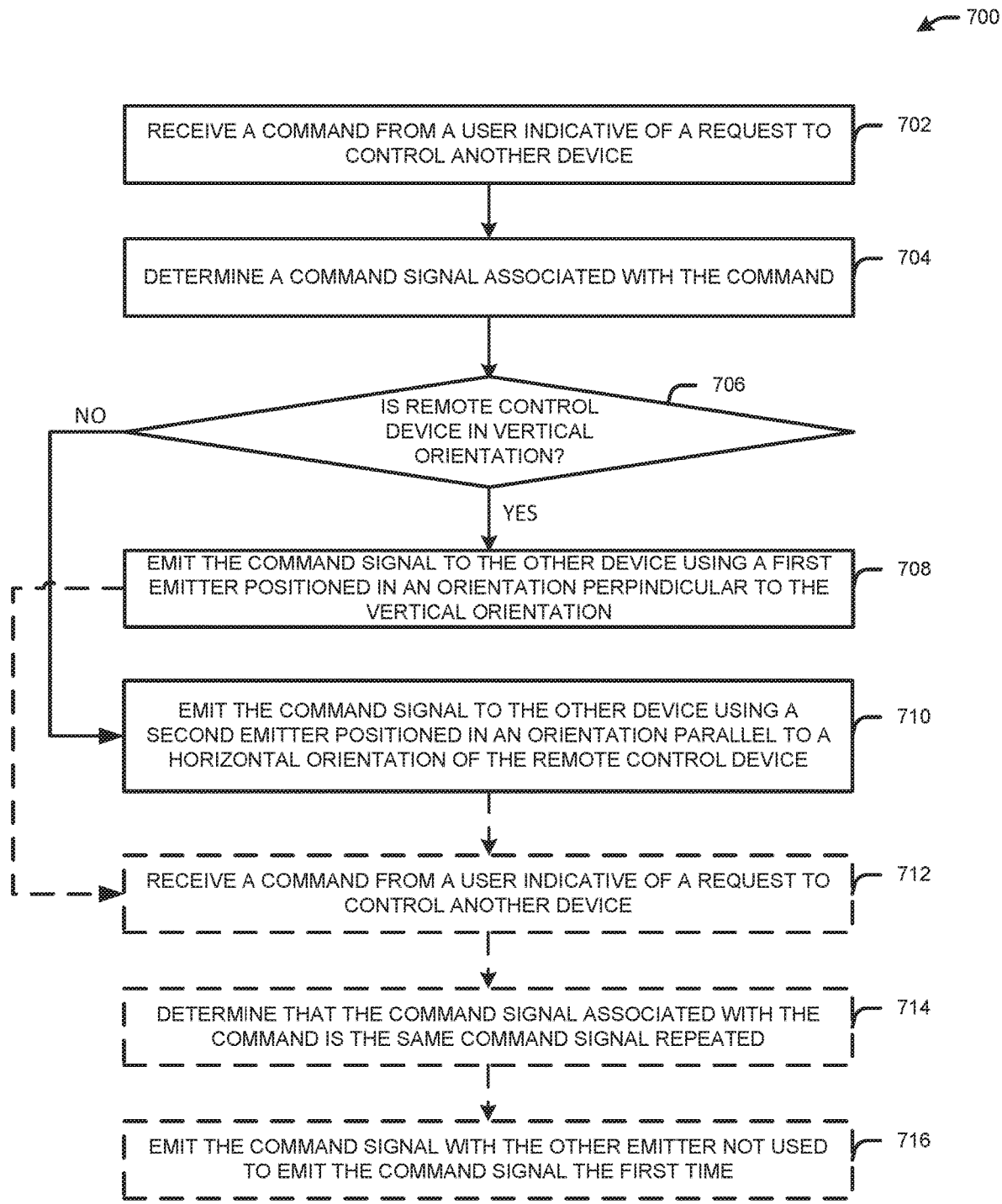
FIG. 7 illustrates a flow diagram for a process for sending command signals with a remote control device based on the orientation of the remote control device, in accordance with one or more example embodiments of the present disclosure.

FIG. 7 illustrates a flow diagram for a process 700 for sending command signals with a remote control device based on the orientation of the remote control device, in accordance with one or more example embodiments of the present disclosure.

At block 702, processing circuitry of a remote control device (e.g., the remote control device 106 of FIG. 1) may receive a voice command from a user (e.g., user 104 of FIG. 1). The voice command may be indicative of a request for the remote control device to control another device (e.g., display 128 and/or sound bar 130 of FIG. 1). The command may indicate a selection of content for playback, an adjustment of volume, a change of channels, a change of device settings, a change of input, or the like.

At block 704, the processing circuitry of the remote control device may determine a command signal associated with the voice command. For example, a microphone (e.g., microphone 409 of FIG. 4) may capture the voice command, and the device may translate the voice command into a command signal. The voice command may be sent to another device to be translated into one or more command signals. The other device may provide the one or more command signals to the remote control device to be emitted.

At block 706, the processing circuitry of the remote control device may determine if the device is in a vertical orientation. Using information, such as data from one or more accelerometers (e.g., accelerometers 415 of FIG. 4), the remote control device may determine its position relative to gravity. For example, if the orientation of the remote control device is closer to parallel with the direction of gravity than perpendicular to the direction of gravity, then the remote control device may determine that its orientation is more vertical than horizontal, and may proceed to block 708. If the orientation of the remote control device is closer to perpendicular with the direction of gravity than parallel to the direction of gravity, then the remote control device may determine that its orientation is more horizontal than vertical, and may proceed to block 710. The remote control device also may determine orientation based on the type of input command provided by a user. For example, if the remote control device determines that a user provided a voice command, the remote control device may determine that the orientation is more likely to be vertical, whereas if the remote control device determines that a user provided a button push or touch input command, the remote control device may determine that the orientation is more likely to be horizontal.

At block 708, the processing circuitry of the remote control device may cause the remote control device to emit a command signal to another device. Because the remote control device determined that it is in a vertical orientation, the remote control device may use a particular one of multiple emitters (e.g., emitters 416 of FIG. 4) to emit the command signal. For example, in a vertical orientation, one emitter (e.g., emitter 416B of FIG. 4) may be facing a media device (e.g., display 432 of FIG. 4) more than another emitter (e.g., emitter 416A of FIG. 4). The emitter facing the device intended to receive a command signal may be more likely to deliver the command signal to the receiving device, and so the remote control device may use that emitter for emitting the command signal.

At block 710, the processing circuitry of the remote control device may cause the remote control device to emit the command signal using another emitter. For example, if emitter 416B is used when the remote control device is identified as being in a vertical orientation, then emitter 416A may be used to emit the command signal if the remote control device is in a more horizontal orientation. This way, the remote control device uses the emitter most likely to cause a command signal to be received by the intended receiving device.

At block 712, the processing circuitry of the remote control device optionally may identify the same command received previously at block 702. For example, a user may recognize that a voice command was not properly executed, and may repeat the same voice command. The voice command may result in the device receiving the same command which was received within a time period or was received consecutively.

At block 714, the processing circuitry of the remote control device may determine that the command was the same as received previously at block 702. If the commands were received consecutively and/or within a short enough time, the remote control device may identify a repeat instruction and may determine that the instruction was not properly executed. For example, the remote control device may have used the wrong emitter to emit the command signal associated with the user's input, and may determine that a different emitter may be used to emit the command signal.

At block 716, the processing circuitry of the remote control device may emit the command signal using a different emitter than the one used in block 708 or 710. The device may note the repeat request and may store an indication that the emitter used at block 716 is the better emitter to use when the same user input is identified in the future.

Figure 8:
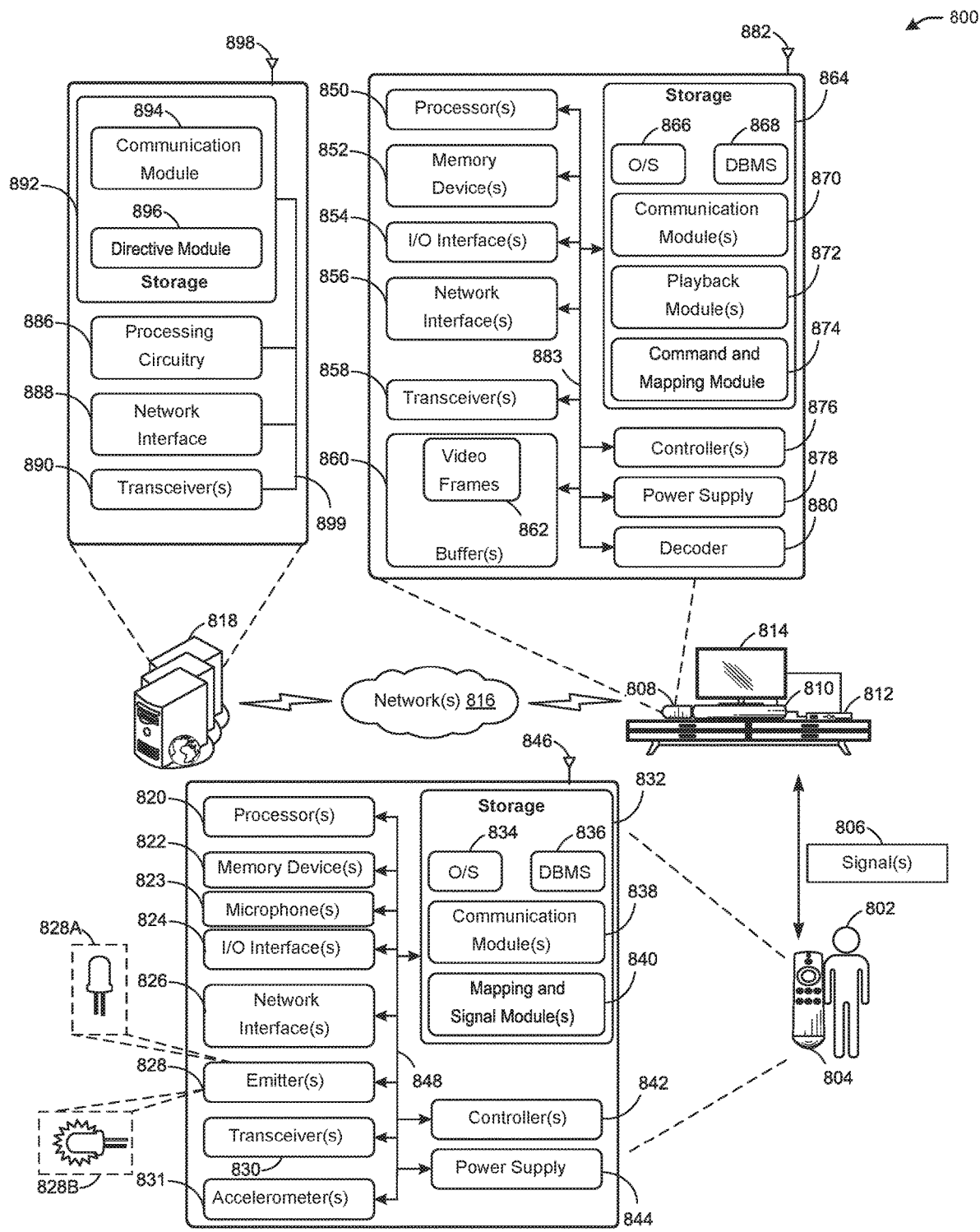
FIG. 8 illustrates a system for controlling the state of a remote control device to allow the remote control device to control multiple other devices, in accordance with one or more example embodiments of the present disclosure.

FIG. 8 illustrates a system 800 for controlling the state of a remote control device to allow the remote control device to control multiple other devices, in accordance with one or more example embodiments of the present disclosure.

Referring to FIG. 8, a user 802 may provide input commands to a remote control device 804, which may send one or more signals (e.g., signals 806) to one or more devices such as device 808 (e.g., a media streaming device), sound bar 810, cable box 812, display 814, or the like. The device 808 may communicate over one or more networks 816 with one or more remote servers (e.g., server 818) to translate commands provided by the user 802 to the remote control device 804 into command signals.

The remote control device 804 may include one or more components, which may correspond to the components described in FIG. 4. For example, the remote control device 804 may include one or more processors 820, one or more memory devices 822, one or more microphones 823, one or more input/output interfaces 824, one or more network interfaces 826, one or more emitters 828 (e.g., including emitter 828A and emitter 828 B), one or more transceiver 830, one or more accelerometers 831, storage 832 (e.g., which may include O/S 834, DBMS 836, one or more communication modules 838, and one or more mapping and signal modules 840), one or more controller 842, power supply 844, one or more antennae 846, and bus 848. The components may function according to the description of the corresponding components described in FIG. 4.

The remote control device 804 may optionally include one or more antenna(e) 846 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS)

antenna for receiving GNSS signals from a GNSS satellite, a Bluetooth antenna for transmitting or receiving Bluetooth signals, a Near Field Communication (NFC) antenna for transmitting or receiving NFC signals, an RFID antenna, and so forth.

The device 808 may include one or more components which may allow the device 808 to communicate with the remote control device 804, the server 818, and any other devices. The device 808 may include one or more processors 850, one or more memory devices 852, one or more I/O interfaces 854, one or more network interfaces 856, one or more transceiver 858, one or more buffers 860 to store video frames 862 for video playback, storage 864 (e.g., which may include O/S 866, DMBS 868, one or more communication modules 870, one or more playback modules 872, and one or more command and mapping modules 874), one or more controllers 876, one or more power supplies 878, a decoder 880 (e.g., integrated circuitry for decoding the video frames 862), and one or more antennae 882.

The server 818 may include one or more components, such as processing circuitry 886, one or more network interfaces 888, one or more transceivers 890, storage 892 (e.g., which may include one or more communication modules 894 and one or more directive modules 896), and one or more antenna 898.

The storage 864 and the storage 892 may include removable storage and/or non-removable storage including, but not limited to, magnetic storage, optical disk storage, and/or tape storage. The storage 864 and the storage 892 may provide non-volatile storage of computer-executable instructions and other data. The storage 864 and the storage 892, removable and/or non-removable, are an example of computer-readable storage media (CRSM) as that term is used herein.

The storage 864 may store computer-executable code, instructions, or the like that may be executable by the processing circuitry 850 to cause the processing circuitry 850 to perform or initiate various operations (e.g., operations associated with computer-executable instructions for the one or more communication modules 870, the one or more playback modules 872, and/or the one or more command and mapping modules 874). The storage 864 may additionally store data that may be copied for use by the processing circuitry 850 during the execution of the computer-executable instructions. Moreover, output data generated as a result of execution of the computer-executable instructions by the processing circuitry 850 may be copied to the storage 864 for non-volatile storage. The storage 892 may store computer-executable code, instructions, or the like that may be executable by the processing circuitry 886 to cause the processing circuitry 886 to perform or initiate various operations (e.g., operations associated with computer-executable instructions for the one or more communication modules 894, and/or the one or more directive modules 896). The storage 892 may additionally store data that may be copied for use by the processing circuitry 886 during the execution of the computer-executable instructions. Moreover, output data generated as a result of execution of the computer-executable instructions by the processing circuitry 886 may be copied to the storage 892 for non-volatile storage.

More specifically, the storage 864 may store one or more program module(s), applications, engines, computer-executable code, scripts, or the like. Some or all of these module(s) may be or include sub-module(s). Any of the components depicted as being stored in the storage 864 may include any combination of software, firmware, and/or hardware. The software and/or firmware may include computer-executable code, instructions, or the like that may executed by one or more of the processing circuitry 850. Any of the components depicted as being stored in the storage 864 may support the functionality described in reference to the corresponding components named earlier in this disclosure. The storage 892 may store one or more program module(s), applications, engines, computer-executable code, scripts, or the like. Some or all of these module(s) may be or include sub-module(s). Any of the components depicted as being stored in the storage 892 may include any combination of software, firmware, and/or hardware. The software and/or firmware may include computer-executable code, instructions, or the like that may executed by one or more of the processing circuitry 886. Any of the components depicted as being stored in the storage 892 may support the functionality described in reference to the corresponding components named earlier in this disclosure.

The storage 864 may further store various types of data utilized by the components of the device 808. Any data stored in the storage 864 may be used by the processing circuitry 850 in executing computer-executable code. In addition, any data depicted as being stored in the storage 864 may potentially be stored in one or more datastore(s). The datastore(s) may include, but are not limited to, databases (e.g., relational, object-oriented, etc.), file systems, flat files, distributed datastores in which data is stored on more than one node of a computer network, peer-to-peer network datastores, or the like. The storage 892 may further store various types of data utilized by the components of the server 818. Any data stored in the storage 892 may be used by the processing circuitry 886 in executing computer-executable code. In addition, any data depicted as being stored in the storage 892 may potentially be stored in one or more datastore(s). The datastore(s) may include, but are not limited to, databases (e.g., relational, object-oriented, etc.), file systems, flat files, distributed datastores in which data is stored on more than one node of a computer network, peer-to-peer network datastores, or the like.

The storage 864 may store the one or more communication modules 870, the one or more playback modules 872, and the one or more command and mapping modules 874. The one or more communication modules 870 may provide executable code for identifying commands received by the device 808, sending the commands for translation, receiving commands, states, directives, and the like. The one or more playback modules may include executable code for causing the decoder 880 to decode the video frames 862 for playback. The one or more command and mapping modules 874 may provided executable code for converting directives to commands, determining a state for the remote control device 804, a mapping associated with the state, and command signals which correspond to user inputs and the respective devices intended to perform actions associated with the user inputs. The storage 892 may store the one or more communication modules 894 and the one or more directive modules 896. The one or more communication modules 894 may provide executable code for identifying commands received by the server 818, and sending directives. The one or more directive modules may include executable code for determining directives based on received commands and signals.

The processing circuitry 850 may be configured to access the storage 864 and execute the computer-executable instructions loaded therein. For example, the processing circuitry 850 may be configured to execute computer-executable instructions of the various program module(s), applications, engines, or the like of the device 808 to cause or facilitate various operations to be performed in accordance with one or more embodiments of the disclosure. The processing circuitry 886 may be configured to access the storage 892 and execute the computer-executable instructions loaded therein. For example, the processing circuitry 886 may be configured to execute computer-executable instructions of the various program module(s), applications, engines, or the like of the server 818 to cause or facilitate various operations to be performed in accordance with one or more embodiments of the disclosure. The processing circuitry 850 and the processing circuitry 886 may include any suitable processing unit capable of accepting data as input, processing the input data in accordance with stored computer-executable instructions, and generating output data. The processing circuitry 850 and the processing circuitry 886 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an Image Signal Processor (ISP), a digital signal processor (DSP), and so forth. Further, the processing circuitry 850 and the processing circuitry 886 may have any suitable microarchitecture design that includes any number of constituent components such as, for example, registers, multiplexers, arithmetic logic units, cache controllers for controlling read/write operations to cache memory, branch predictors, or the like. The microarchitecture design of the processing circuitry 886 may be capable of supporting any of a variety of instruction sets.

The device 808 may further include one or more network interface(s) 856 via which the device 808 may communicate with any of a variety of other systems, platforms, networks, devices, and so forth. The server 818 may further include one or more network interface(s) 888 via which the server 818 may communicate with any of a variety of other systems, platforms, networks, devices, and so forth. The network interface(s) 856 and 888 may enable communication, for example, with one or more wireless routers, one or more host servers, one or more web servers, and the like via one or more networks. The network interface(s) 856 and 888 may enable communication, for example, with one or more wireless routers, one or more host servers, one or more web servers, and the like via one or more networks.

The transceivers 858 and 890 may include any suitable type of transceiver depending, for example, on the communications protocols used to transmit or receive signals. The transceivers 858 and 890 may additionally, or alternatively, include a Wi-Fi transceiver configured to transmit or receive signals in accordance with established standards and protocols. The transceivers 858 and 890 may include any suitable radio component(s) for transmitting or receiving signals in a bandwidth and/or channels. The transceivers 858 may include any known receiver and baseband suitable for communicating via the communications protocols utilized by the device 808. The transceivers 890 may include any known receiver and baseband suitable for communicating via the communications protocols utilized by the server 818. The transceivers 858 and 890 may further include a low noise amplifier (LNA), additional power signal amplifiers (PA), an analog-to-digital (A/D) converter, one or more buffers, a digital baseband, or the like.

It should be appreciated that the program module(s), applications, computer-executable instructions, code, or the like depicted in FIG. 8 as being stored in the storage 864 and in the storage 892 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the device 808 or the server 818, and/or hosted on other computing device(s) accessible via one or more networks, may be provided to support the functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the device 808 or server 818 may include alternate and/or additional hardware, software, or firmware components beyond those described or depicted without departing from the scope of the disclosure. More particularly, it should be appreciated that software, firmware, or hardware components depicted as forming part of the device 808 or server 818 are merely illustrative and that some components may not be present or additional components may be provided in various embodiments. While various illustrative program module(s) have been depicted and described as software module(s) stored in the storage 864 or the storage 892, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

The device 808 may further include one or more buses 883 that functionally couple various components of the device 808. The server 818 may further include one or more buses 899 that functionally couple various components of the server 818. The bus(es) 883 and 899 may include at least one of a system bus, a memory bus, an address bus, or a message bus, and may permit the exchange of information (e.g., data (including computer-executable code), signaling, etc.) between various components of the device 808 or the server 818. The bus(es) 883 or 899 may include, without limitation, a memory bus or a memory controller, a peripheral bus, an accelerated graphics port, and so forth. The bus(es) 883 or 899 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The bus(es) 883 or 899 may include at least one of a system bus, a memory bus, an address bus, or a message bus, and may permit the exchange of information (e.g., data (including computer-executable code), signaling, etc.) between various components of the device 808. The bus(es) 883 or 899 may include, without limitation, a memory bus or a memory controller, a peripheral bus, an accelerated graphics port, and so forth. The bus(es) 883 or 899 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 852 of the device 808 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 852 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 852 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

More specifically, the storage 864 may store one or more operating systems (O/S) 866; one or more database management systems (DBMS) 868; and one or more program module(s), applications, engines, computer-executable code, scripts, or the like such as, for example, the one or more communication module(s) 870, the one or more playback modules 872, and the one or more command and mapping modules 874. Some or all of these module(s) may be or include sub-module(s). Any of the components depicted as being stored in the storage 864 may include any combination of software, firmware, and/or hardware. The software and/or firmware may include computer-executable code, instructions, or the like that may be loaded into the memory 852 for execution by one or more of the processor(s) 850. Any of the components depicted as being stored in the storage 864 may support the functionality described in reference to the corresponding components named earlier in this disclosure.

The storage 864 may further store various types of data utilized by the components of the device 808. Any data stored in the storage 864 may be loaded into the memory 852 for use by the processor(s) 850 in executing computer-executable code. In addition, any data depicted as being stored in the storage 864 may potentially be stored in one or more datastore(s) and may be accessed via the DBMS 868 and loaded in the memory 852 for use by the processor(s) 850 in executing computer-executable code. The storage 892 may further store various types of data utilized by the components of the server 818.

Referring now to other illustrative components depicted as being stored in the storage 864, the O/S 866 may be loaded from the data storage 864 into the memory 852 and may provide an interface between other application software executing on the device 808 and the hardware resources of the device 808. More specifically, the O/S 866 may include a set of computer-executable instructions for managing the hardware resources of the device 808 and for providing common services to other application programs (e.g., managing memory allocation among various application programs). In certain example embodiments, the O/S 866 may control execution of the other program module(s) to dynamically enhance characters for content rendering.

The DBMS 868 may be loaded into the memory 852 and may support functionality for accessing, retrieving, storing, and/or manipulating data stored in the memory 852 and/or data stored in the storage 864. The DBMS 868 may use any of a variety of database models (e.g., relational model, object model, etc.) and may support any of a variety of query languages. The DBMS 868 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the device 808, the input/output (I/O) interface(s) 854 may facilitate the receipt of input information by the device 808 from one or more I/O devices as well as the output of information from the device 808 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 808 or may be separate. The I/O devices may further include, for example, any number of peripheral devices such as data storage devices, printing devices, and so forth. The I/O interface(s) 854 may also include an interface for an external peripheral device connection such as HDMI, universal serial bus (USB), micro-USB, FireWire, Thunderbolt, Ethernet port or other connection protocol that may connect to one or more networks.

The controller(s) 876 may be any microcontroller or microprocessor configured to control one or more operations of the device 808. The power supply 878 may be a battery, such as a lithium-ion battery. The power supply 878 may be provided power from a power receptacle or other power charging device.

The device 808 may optionally include one or more antenna(e) 882 and the server 818 may include one or more antenna(e) 898 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, an RFID antenna, and so forth.

Any of the communications networks 816 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 816 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 816 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
   receiving, by one or more computer processors coupled to memory of a device, first voice data from a remote control device, wherein the first voice data is indicative of a first voice command for a request to play digital content from a cable box;
   sending, by the one or more computer processors, the first voice data to a server, wherein the server is configured to identify one or more instructions associated with a meaning of the first voice command, wherein a first instruction of the one or more instructions causes a television to enable a first connector operatively coupled to the cable box and wherein a second instruction of the one or more instructions causes a stereo receiver to enable a second connector operatively coupled to the cable box;
   receiving, by the one or more computer processors, from the server, the first instruction and the second instruction;
   determining, by the one or more computer processors, a first control mapping for the television, the first control mapping associated with a first command signal to cause the television to perform the first instruction;
   determining, by the one or more computer processors, that a volume associated with the cable box is controlled by the stereo receiver;
   determining, by the one or more computer processors, a second control mapping for the stereo receiver, the second control mapping associated with a second command signal to cause the stereo receiver to perform the second instruction and indicating that the volume associated with the cable box is controlled by the stereo receiver;
   sending, by the one or more computer processors, a state update to the remote control device, wherein the state update indicates the first control mapping and the second control mapping; and
   causing, by the one or more computer processors, the remote control device to emit the first command signal and the second command signal using one or more light emitting diodes (LEDs).

2. The method of claim 1, further comprising:
   receiving, by the one or more computer processors, from the server, a third instruction associated with the meaning of the first voice command, wherein the third instruction causes the television to be powered on, wherein the first control mapping is further associated with a third command signal to cause the television to perform the third instruction; and
   causing, by the one or more computer processors, the remote control device to emit the third command signal using the one or more LEDs.

3. The method of claim 1, further comprising:
   receiving, by the one or more computer processors, from the server, a third instruction associated with the meaning of the first voice command, wherein the third instruction causes selection of the digital content using the cable box;
   determining, by the one or more computer processors, a third control mapping for the cable box, the third control mapping associated with a third command signal to cause the cable box to perform the third instruction, wherein the state update further indicates the third control mapping; and
   causing, by the one or more computer processors, the remote control device to emit the third command signal using the one or more LEDs.

4. The method of claim 1, further comprising:
   receiving, by the one or more computer processors, second voice data from the remote control device, wherein the second voice data is indicative of a second voice command for a second request to play second digital content from a streaming video device;
   sending, by the one or more computer processors, the second voice data to the server, wherein the server is configured to determine a third instruction associated with a meaning of the second voice data, and wherein the third instruction causes the television to enable a third connector operatively coupled to the streaming video device;
   receiving, by the one or more computer processors, from the server, the third instruction;
   determining, by the one or more computer processors, that a volume associated with the streaming video device is controlled by the television;
   determining, by the one or more computer processors, a third control mapping for the television, wherein the third control mapping indicates that the volume associated with the streaming video device is controlled by the television;
   sending, by the one or more computer processors, a second state update to the remote control device, wherein the second state update comprises an indication of the third control mapping; and
   causing, by the one or more computer processors, the remote control device to emit a third command signal using the one or more LEDs.

5. A method comprising:
   receiving, by a first device, voice data from a remote control device, wherein the voice data is associated with causing a second device to perform an action;
   sending, by the first device, a first signal to a server, the first signal including a representation of the voice data;
   receiving, by the first device, a second signal from the server, wherein the second signal is based on the representation of the voice data and includes an indication that the voice data is associated with causing the second device to perform the action;
   determining, by the first device, an instruction based on the second signal, wherein the instruction is associated with the remote control device causing the second device to perform the action;
   determining, by the first device, a state update, the state update indicative of a current connection between the second device and a third device, the current connection indicative of a control mapping that maps an input to be received by the remote control device to a command signal to send to the third device;
   sending, by the first device, the state update to the remote control device; and
   sending, by the first device, the instruction to the remote control device.

6. The method of claim 5, wherein the instruction is a first instruction, wherein the control mapping is a first control mapping, wherein the state update is a first state update, wherein the state of the second device is a first state of the second device, and wherein the input is a first input, the method further comprising:
   receiving, by the first device, a third signal from the server, wherein the third signal is based on the representation of the voice data and includes an indication that the voice data is associated with causing the third device to perform a second action;
   determining, by the first device, a second instruction based on the third signal, wherein the second instruction is associated with the remote control device causing the third device to perform the second action;
   determining, by the first device, a second state update, the second state update indicative of a second control mapping that maps a second input to be received by the remote control device to a second command signal to send to the third device;
   sending, by the first device, the second state update to the remote control device; and
   sending, by the first device, the second instruction to the remote control device.

7. The method of claim 5, wherein the instruction is a first instruction, the method further comprising:
   receiving, by the first device, a third signal from the server, wherein the third signal is based on the representation of the voice data and includes an indication that the voice data is associated with causing the second device to perform a second action;
   determining, by the first device, a second instruction based on the third signal, wherein the second instruction is associated with the remote control device causing the second device to perform the second action; and
   sending, by the first device, the second instruction to the remote control device.

8. The method of claim 5, wherein the action is associated with enabling a connector operatively coupled to the third device.

9. The method of claim 5, further comprising causing, by the first device, the remote control device to emit the command signal based on the instruction.

10. The method of claim 5, wherein the action is associated with at least one of powering on the second device, powering off the second device, selecting content using the second device, or controlling a volume of the second device.

11. The method of claim 5, wherein the voice data is first voice data, wherein the command signal is a first command signal, wherein the action is a first action, further comprising:
   receiving, by the first device, second voice data from the remote control device, wherein the second voice data is associated with causing the third device to perform a second action;
   sending, by the first device, a third signal to the server, the third signal including a representation of the second voice data;
   receiving, by the first device, a fourth signal from the server, wherein the fourth signal is associated with causing the third device to perform the second action and includes an indication that the second voice data is associated with causing the third device to perform the second action;
   determining, by the first device, a second instruction based on the fourth signal, wherein the second instruction is associated with the remote control device causing the third device to perform the second action; and
   sending, by the first device, the second instruction to the remote control device.

12. The method of claim 5, wherein the state update indicates that the control mapping is based on the state of the second device.

13. The method of claim 5, wherein the current connection is indicative of a port used to connect the second device and the third device.

14. A first device comprising memory and at least one processor, wherein the at least one processor is configured to:
   receive a voice command from a user, wherein the voice command is associated with causing a second device to perform an action;
   send a first signal to a third device, the first signal including a representation of the voice command;
   receive an instruction from the third device, wherein the instruction is associated with the first device causing the second device to perform the action;
   receive a state update from the third device, the state update indicative of a current connection between the second device and a fourth device, the current connection indicative of a control mapping that maps an input to be received by the first device to a first command signal to send to the fourth device;
   emit a second command signal to the second device based on the instruction; receive the input;
   determine, based on the control mapping, that the input is associated with the first command signal; and
   emit the first command signal to the fourth device.

15. The first device of claim 14, wherein the action is a first action, wherein the instruction is a first instruction, wherein the at least one processor is further configured to:
   receive a second instruction from the third device, wherein the second instruction is associated with the first device causing the second device to perform a second action;
   determine, based on the control mapping, that the second action is associated with a third command signal; and
   emit the third command signal to the second device.

16. The first device of claim 14, wherein the action is a first action, wherein the instruction is a first instruction, wherein the at least one processor is further configured to:

receive a second instruction from the third device, wherein the second instruction is associated with the first device causing the fourth device to perform a second action; and emit a third command signal to the fourth device based on the second instruction.

17. The first device of claim 14, wherein the action is associated with at least one of powering on the third device, powering off the third device, selecting content using the third device, or controlling a volume of the third device.

18. The first device of claim 14, further comprising an emitter, wherein the at least one processor is further configured to determine that the first device is in a vertical orientation, wherein to send the first command signal comprises to cause the emitter to emit the first command signal, wherein the emitter is positioned in an orientation perpendicular to the vertical orientation.

19. The first device of claim 14, further comprising an emitter, wherein the input is a button input received from the user, wherein the button input is associated with causing the second device to perform a third action, wherein the at least one processor is further configured to:

determine that the first device is in a horizontal orientation; and emit the second command signal to the second device, wherein to emit the second command signal comprises to cause the emitter to emit the second command signal, wherein the emitter is positioned in an orientation parallel to the horizontal orientation.

20. The first device of claim 14, further comprising a first emitter and a second emitter, wherein to emit the first command signal comprises to cause the first emitter to emit the first command signal and to cause the second emitter to emit the first command signal.

\* \* \* \* \*